(12) United States Patent
Kato

(10) Patent No.: US 11,789,204 B2
(45) Date of Patent: Oct. 17, 2023

(54) WAVELENGTH CONVERTER, OPTICAL TRANSMISSION SYSTEM AND WAVELENGTH CONVERSION METHOD

(71) Applicant: FUJITSU LIMITED, Kawasaki (JP)

(72) Inventor: Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 17/527,212

(22) Filed: Nov. 16, 2021

(65) Prior Publication Data
US 2022/0229238 A1 Jul. 21, 2022

(30) Foreign Application Priority Data
Jan. 19, 2021 (JP) ................. 2021-006318

(51) Int. Cl.
*G02B 6/27* (2006.01)
*H04J 14/06* (2006.01)

(52) U.S. Cl.
CPC ......... *G02B 6/2773* (2013.01); *G02B 6/2766* (2013.01); *H04J 14/06* (2013.01)

(58) Field of Classification Search
None
See application file for complete search history.

(56) References Cited

U.S. PATENT DOCUMENTS

| | | | | |
|---|---|---|---|---|
| 7,113,279 B2* | 9/2006 | Liu | ............... | G02B 6/272 356/365 |
| 7,489,436 B1* | 2/2009 | Fiorentino | ............... | G02F 1/39 359/332 |
| 8,917,197 B2* | 12/2014 | Kanter | ............... | H03M 1/124 341/137 |
| 11,163,119 B2* | 11/2021 | Yamauchi | ............... | G02B 6/29302 |
| 11,169,427 B2* | 11/2021 | Horn | ............... | G02F 1/3553 |
| 2001/0031110 A1* | 10/2001 | Imajuku | ............... | G02F 1/3519 359/332 |
| 2007/0091310 A1 | 4/2007 | Hainberger et al. | | |
| 2008/0037996 A1* | 2/2008 | Spillane | ............... | G06N 10/00 398/152 |
| 2022/0229238 A1* | 7/2022 | Kato | ............... | H04J 14/06 |

FOREIGN PATENT DOCUMENTS

JP 2003-315858 A 11/2003
JP 2007-531900 A 11/2007

* cited by examiner

*Primary Examiner* — Rhonda S Peace
(74) *Attorney, Agent, or Firm* — Fujitsu Patent Center

(57) ABSTRACT

A wavelength converter includes a polarization beam splitter configured to separate input light into a first polarization and a second polarization that are orthogonal to each other a non-linear optical medium configured to include a first incident end on which the first polarization separated by the polarization beam splitter is incident and a second incident end on which the second polarization separated by the polarization beam splitter is incident at a position different from a position of the first incident end, an optical multiplexer configured to multiplex the first polarization that has passed through the non-linear optical medium and the second polarization that has passed through the non-linear optical medium, and an optical element arranged between the non-linear optical medium and the optical multiplexer, and configured to correct a polarization axis of at least one of the first polarization and the second polarization incident on the optical multiplexer.

10 Claims, 17 Drawing Sheets ially pointed out in the claims.
WAVELENGTH CONVERTER, OPTICAL TRANSMISSION SYSTEM AND WAVELENGTH CONVERSION METHOD

CROSS-REFERENCE TO RELATED APPLICATION

This application is based upon and claims the benefit of priority of the prior Japanese Patent Application No. 2021-6318, filed on Jan. 19, 2021, the entire contents of which are incorporated herein by reference.

FIELD

The embodiments discussed herein are related to a wavelength converter, an optical transmission system, and a wavelength conversion method.

BACKGROUND

A technique has been developed for increasing transmission capacity by increasing the number of wavelength division multiplexing (WDM) channels for continuously increasing traffic of an optical network. One such technique is wavelength conversion. In the wavelength conversion technique, an optical signal is transmitted by using a new wavelength band in a transmission line while using an existing optical transceiver used in a conventional band. In addition to a C-band, which is a conventional communication band, a communication band is extended to an L-band on a long wavelength side of the C-band and an S-band on a short wavelength side of the C-band.

In the wavelength conversion, light having a wavelength different from that of incident light is generated by using a non-linear optical phenomenon of a non-linear optical medium. Since the non-linear optical phenomenon has polarization dependency, a polarization diversity configuration that suppresses the polarization dependency is used. In the polarization diversity configuration, the polarization dependency is reduced by separating incident signal light into polarization components orthogonal to each other by a polarization beam splitter (PBS) and treating each polarization component independently.

Japanese National Publication of International Patent Application No. 2007-531900 is disclosed as related art.

SUMMARY

According to an aspect of the embodiments, a wavelength converter includes a polarization beam splitter configured to separate input light into a first polarization and a second polarization that are orthogonal to each other a non-linear optical medium configured to include a first incident end on which the first polarization separated by the polarization beam splitter is incident and a second incident end on which the second polarization separated by the polarization beam splitter is incident at a position different from a position of the first incident end, an optical multiplexer configured to multiplex the first polarization that has passed through the non-linear optical medium and the second polarization that has passed through the non-linear optical medium, and an optical element arranged between the non-linear optical medium and the optical multiplexer, and configured to correct a polarization axis of at least one of the first polarization and the second polarization incident on the optical multiplexer.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In a case where a polarization state is not optimum in a polarization diversity optical circuit, power of output light varies with time and transmission characteristics of an optical signal deteriorate.

Hereinafter, embodiments of a technique capable of suppressing temporal variation of output optical power and maintaining transmission characteristics satisfactorily even when a polarization state in a polarization diversity optical circuit deviates from an optimum state will be described with reference to the drawings.

Figure 1:
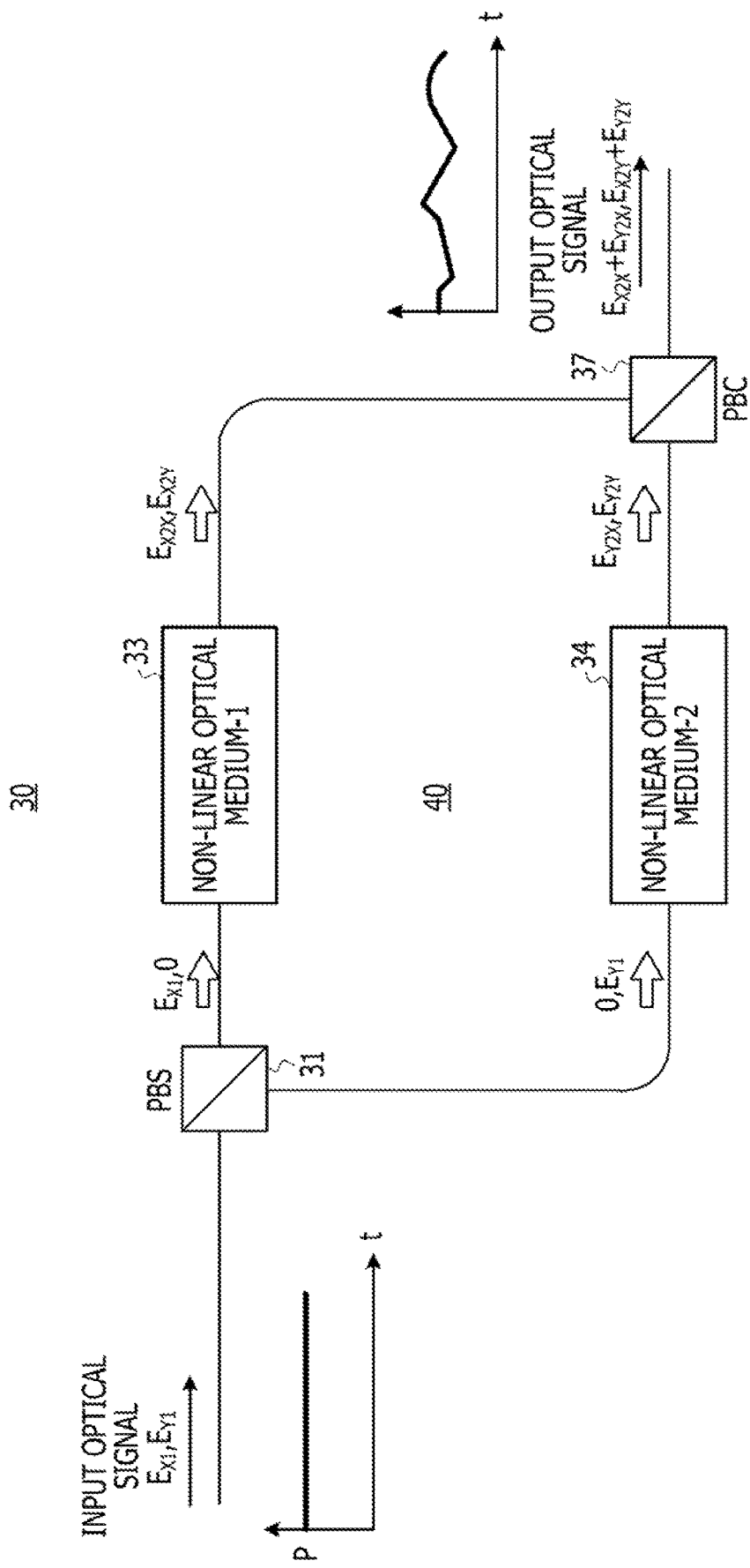
FIG. 1 is a diagram illustrating temporal variation of output optical power.

FIG. 1 is a diagram illustrating temporal variation of output optical power of a polarization diversity optical circuit 40. The polarization diversity optical circuit 40 used in a wavelength converter 30 is adjusted to the optimum state at the time of shipment so as to maximize conversion efficiency. However, when a polarization in the polarization diversity optical circuit 40 deviates from the optimum state during service due to an influence of a disturbance such as vibration, temperature change, stress, or higher order polarization mode dispersion dependent which mainly induced by stress and rotate the polarization of converted light with respect to the pump and the input signal, temporal power variation occurs in output light.

In the polarization diversity optical circuit 40, an input optical signal is separated into two orthogonal polarizations by a polarization beam splitter (PBS) 31. The input optical signal has constant power averaged over time sufficiently longer than the signal modulation rate, and includes a horizontal polarization ($E_{X1}$) and a vertical polarization ($E_{Y1}$). The horizontal polarization transmitted through the PBS 31 is subjected to a non-linear optical effect in a first non-linear optical medium 33 (referred to as "non-linear optical medium-1" in the drawing). The vertical polarization reflected by the PBS 31 is subjected to the non-linear optical effect in a second non-linear optical medium 34 (referred to as "non-linear optical medium-2" in the drawing). The two polarizations, each of which is subjected to the non-linear optical effect, are multiplexed and output by a polarization beam combiner (PBC) 37.

As the non-linear optical media 33 and 34, a highly non-linear fiber (HNLF) is usually used. The HNLF includes a polarization maintaining fiber (PMF) having large difference between refractive indices with respect to a vertical polarization and a horizontal polarization in a cross section orthogonal to an optical axis, and a non-polarization maintaining fiber (NON-PMF) having substantially the same refractive indices with respect to the vertical polarization and the horizontal polarization. In the PMF type HNLF, since a polarization is maintained at input and output, a change in a polarization state due to an influence of a disturbance is very small. However, it is difficult to produce wavelength dispersion characteristics needed for wavelength conversion with good reproducibility. The NON-PMF type HNLF is commonly used for the wavelength conversion because it is possible to produce the wavelength dispersion characteristics needed for the wavelength conversion with relatively good reproducibility. However, since a polarization is not maintained in a process of propagation in a non-linear optical medium, polarization rotation occurs due to an influence of a disturbance.

At the time of multiplexing by the PBC 37, when the two polarizations include only components orthogonal to each other, or when the PBC 37 is an ideal device with an infinite polarization extinction ratio, only orthogonal components are multiplexed and no optical interference occurs. In a case where a polarization of incident light on the PBC 37 is not optimum, parallel components are also multiplexed, and optical interference occurs. Even when an incident state on the PBC 37 is optimally adjusted at the time of shipment in consideration of an influence of polarization rotation by the non-linear optical media 33 and 34 in advance, an unnecessary polarization component is generated in the incident light on the PBC 37 when a rotation angle of a polarization varies due to an influence of a disturbance or the like. For example, light emitted from the first non-linear optical medium 33 includes electric field components ($E_{X2X}$, $E_{X2Y}$), and light emitted from the second non-linear optical medium 34 includes electric field components ($E_{Y2X}$, $E_{Y2Y}$). Among these, $E_{X2Y}$ and $E_{Y2X}$ cause interference.

In the PBC 37, when the target component $E_{X2X}$ is multiplexed with the component $E_{Y2X}$ parallel to the target component $E_{X2X}$, optical interference occurs. Similarly, when the target component $E_{Y2Y}$ is multiplexed with the component $E_{X2Y}$ parallel to the target component $E_{Y2Y}$, optical interference occurs. Such optical interference is observed as temporal optical power variation when optical path lengths of the non-linear optical media 33 and 34 are long.

In an embodiment, even when a state of a polarization incident on the PBC 37 in the wavelength converter 30 deviates from an optimum state, unnecessary interference is avoided and temporal optical power variation is suppressed. The optimum state means a unique state (principle state of polarization) in which polarizations are orthogonal to each other. In order to put a polarization into the optimum state, optical elements for polarization correction such as a polarizer and a PBS 31 are arranged in a stage before multiplexing two polarizations subjected to a non-linear optical process, and states of the polarizations incident on the PBC 37 are optimized. In a more preferable configuration, a polarization rotator or a polarization controller is arranged between the non-linear optical media 33 and 34 and the optical element for polarization correction, and polarization axes of light emitted from the non-linear optical media 33 and 34 are aligned with a polarization axis of the optical element for polarization correction and a polarization axis of an optical multiplexer.

Hereinafter, a specific configuration of the embodiment will be described. In the following description, the same components may be denoted by the same reference signs and duplicate description may be omitted. Furthermore, regardless of a direction of a polarization plane, one of two polarizations separated by the PBS 31 is referred to as a first polarization, and the other is referred to as a second polarization.

Figure 2:
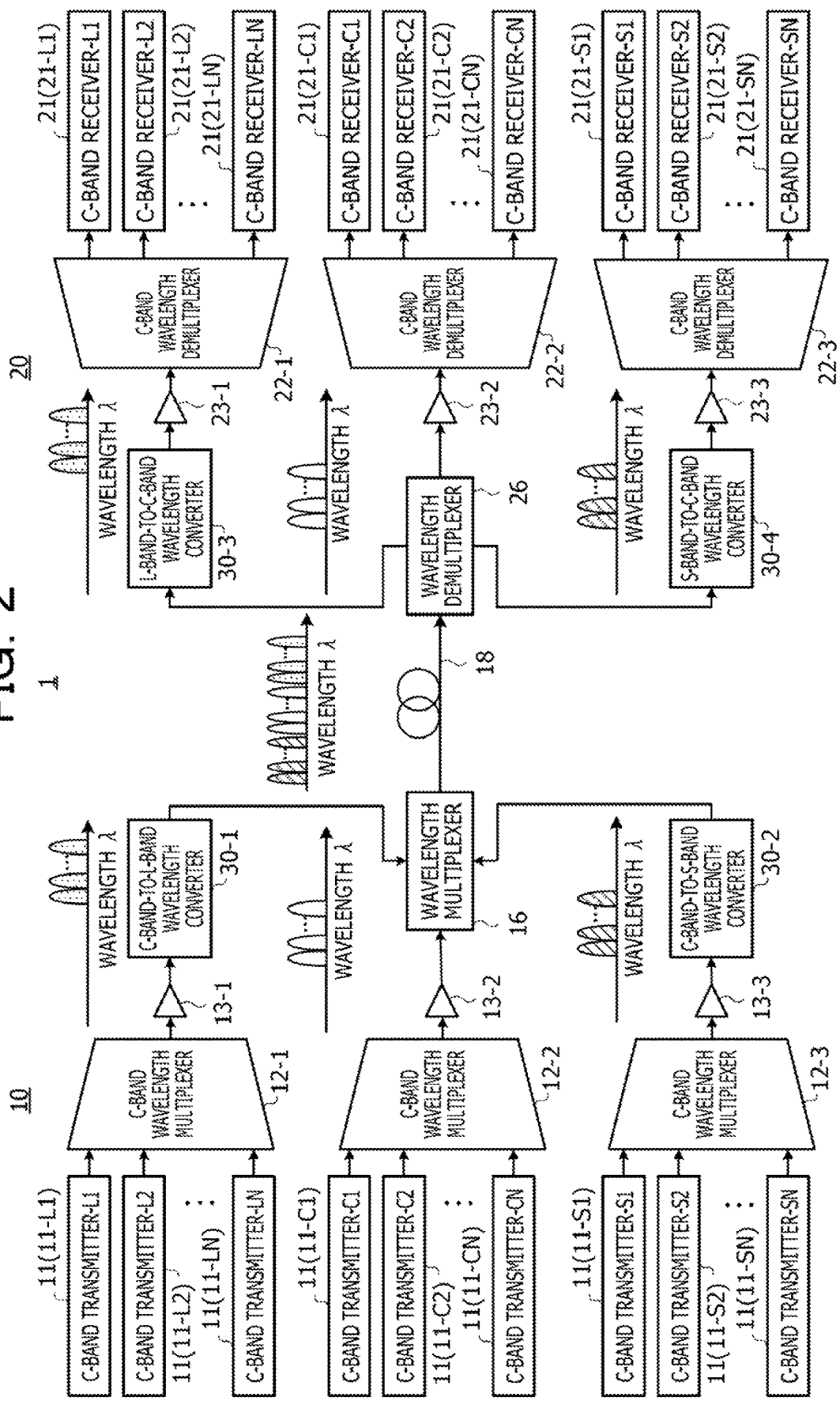
FIG. 2 is a schematic diagram of an optical transmission system to which a wavelength converter of an embodiment is applied.

FIG. 2 is a schematic diagram of an optical transmission system 1 in which the wavelength converter 30 of the embodiment is used. The optical transmission system 1 includes an optical communication device 10 on a transmission side, an optical communication device 20 on a reception side, and an optical transmission line 18 connecting therebetween. Both the optical communication device 10 and the optical communication device 20 have functions of both the transmission side and the reception side, and have the same configuration. However, for convenience of description, the function of the transmission side of the optical communication device 10 and the function of the reception side of the optical communication device 20 will be described as an example.

The optical communication device 10 includes optical transmitters 11-L1 to 11-LN included in a first group, optical transmitters 11-C1 to 11-CN included in a second group, and optical transmitters 11-S1 to 11-SN included in a third group (hereinafter, collectively referred to as "optical transmitters 11" as appropriate). These optical transmitters 11 are each a photoelectric conversion front end circuit of an optical transponder, for example. The plurality of optical transmitters 11 has the same configuration, and outputs, for example, signals having a wavelength channel of a C-band (1530 to 1565 nm) (each of which is referred to as "C-band transmitter" in the drawing).

Output light of the optical transmitters 11-L1 to 11-LN in the first group is multiplexed by a first wavelength multiplexer 12-1. Output light of the optical transmitters 11-C1 to 11-CN in the second group is multiplexed by a second wavelength multiplexer 12-2. Output light of the optical transmitters 11-S1 to 11-SN in the third group is multiplexed by a third wavelength multiplexer 12-3. The first wavelength multiplexer 12-1, the second wavelength multiplexer 12-2, and the third wavelength multiplexer 12-3 have the same function and configuration, and multiplex input signals having a plurality of wavelength channels and output resultant signals.

Output of the first wavelength multiplexer 12-1 is amplified by a first optical amplifier 13-1. Output of the second wavelength multiplexer 12-2 is amplified by a second optical amplifier 13-2. Output of the third wavelength multiplexer 12-3 is amplified by a third optical amplifier 13-3. The first optical amplifier 13-1, the second optical amplifier 13-2, and the third optical amplifier 13-3 have the same function and configuration, and amplify multiplexed optical signals of the C-band.

The C-band signal light amplified by the first optical amplifier 13-1 is subjected to wavelength conversion by a first wavelength converter 30-1, and input to a wavelength multiplexer 16. In this example, the first wavelength converter 30-1 collectively converts the C-band signal light to L-band signal light. The C-band signal light amplified by the third optical amplifier 13-3 is subjected to wavelength conversion by a second wavelength converter 30-2, and input to the wavelength multiplexer 16. In this example, the second wavelength converter 30-2 collectively converts the C-band signal light to S-band signal light.

The C-band signal light amplified by the second optical amplifier 13-2 is not subjected to wavelength conversion and is input to the wavelength multiplexer 16 as it is. The wavelength multiplexer 16 multiplexes the L-band signal light, the C-band signal light, and the S-band signal light, and outputs a wavelength division multiplexing (WDM) signal to the optical transmission line 18. This WDM signal includes wavelength channels from the L-band to the S-band, and optical communication over a wide band is carried out. The WDM signal is propagated through the optical transmission line 18, and is received by the optical communication device 20.

In the optical communication device 20, the received optical signal is demultiplexed into L-band signal light, C-band signal light, and S-band signal light by a wavelength demultiplexer 26. The L-band signal light is converted to C-band signal light by a third wavelength converter 30-3, is amplified by an optical amplifier 23-1, and is demultiplexed into different wavelength channels by a first wavelength demultiplexer 22-1.

The S-band signal light is converted to C-band signal light by a fourth wavelength converter 30-4, is amplified by an optical amplifier 23-3, and is demultiplexed into different wavelength channels by a third wavelength demultiplexer 22-3. The C-band signal light is not subjected to wavelength conversion, is amplified by an optical amplifier 23-2 as it is, and is demultiplexed into different wavelength channels by a second wavelength demultiplexer 22-2.

The optical amplifiers 23-1 to 23-3 have the same function and configuration. The wavelength demultiplexers 22-1 to 22-3 have the same function and configuration, and in this example, demultiplex C-band signal light into different wavelength channels.

The beams of signal light demultiplexed by the first wavelength demultiplexer 22-1 are supplied to optical receivers 21-L1 to 21-LN in a first group. The beams of signal light demultiplexed by the second wavelength demultiplexer 22-2 are supplied to optical receivers 21-C1 to 21-CN in a second group. The beams of signal light demultiplexed by the third wavelength demultiplexer 22-3 are supplied to optical receivers 21-S1 to 21-SN in a third group. The optical receivers 21-L1 to 21-LN, the optical receivers 21-C1 to 21-CN, and the optical receivers 21-51 to 21-SN are collectively referred to as "optical receivers 21" as appropriate.

The optical receivers 21 are each a photoelectric conversion front end circuit of an optical transponder, for example. The plurality of optical receivers 21 has the same configuration, and converts, for example, light having a wavelength channel of the C-band (1530 to 1565 nm) to electric signals.

The optical transmission system 1 does not use optical components for individual bands, but uses common optical transmitters and receivers, wavelength multiplexers and demultiplexers, optical amplifiers, and the like. By using the wavelength converters 30-1 to 30-4, even when a polarization in the polarization diversity optical circuit deviates from the optimum state due to an influence of a disturbance such as vibration, temperature change, or generation of stress, a polarization state is controlled to the optimum polarization state, and temporal variation of output power of converted light is suppressed. With this configuration, transmission capacity may be increased while improving transmission characteristics.

Figure 3:
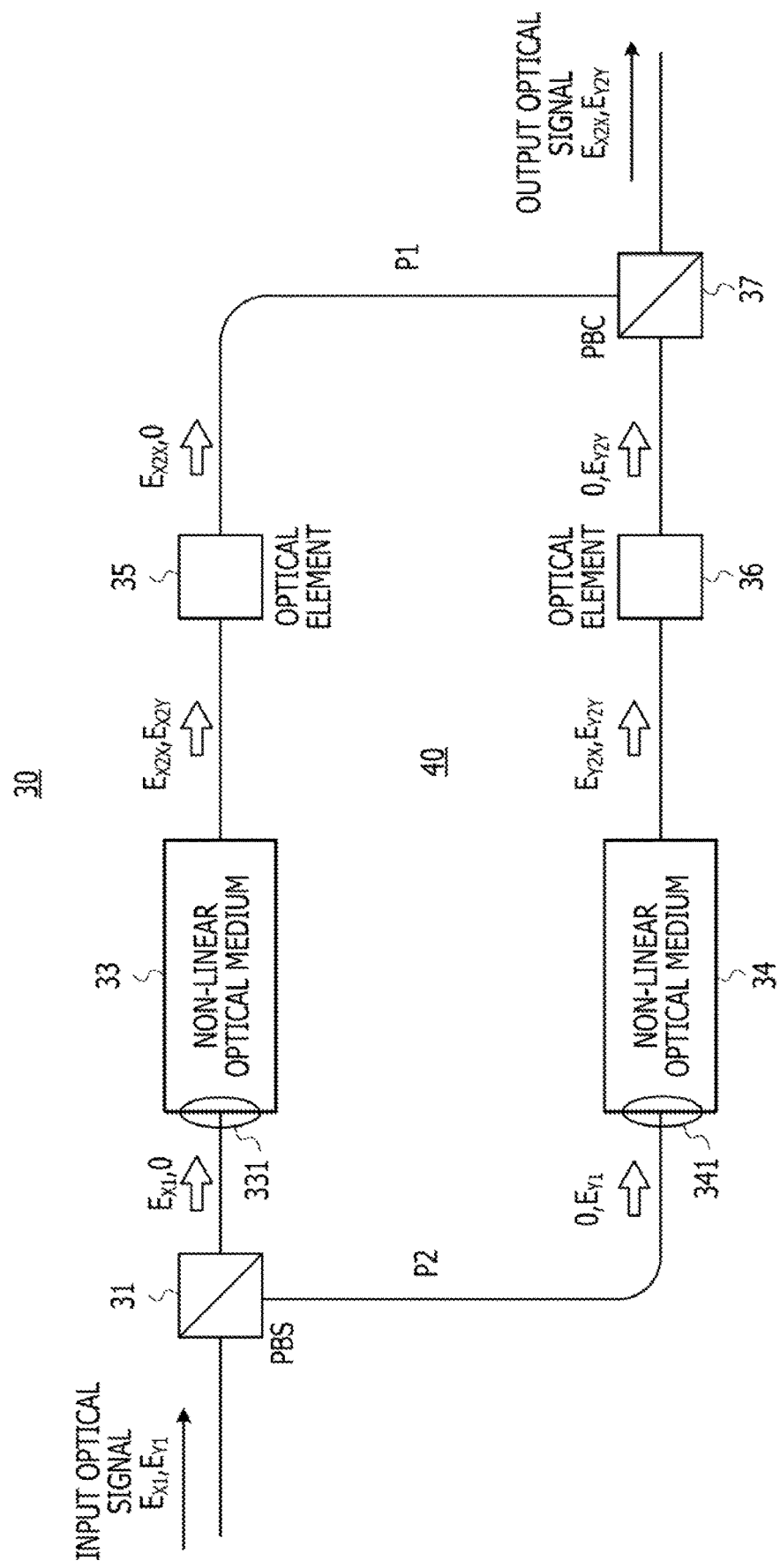
FIG. 3 is a diagram illustrating a basic configuration of the wavelength converter of the embodiment.

FIG. 3 is a basic configuration diagram of the wavelength converter 30. The wavelength converter 30 includes the PBS 31, the PBC 37, the non-linear optical medium 33, an optical element 35, the non-linear optical medium 34, and an optical element 36. These optical components are connected by, for example, a single mode fiber or a polarization maintaining fiber to form the polarization diversity optical circuit 40. Instead of adjusting a polarization between the optical components with the polarization maintaining fiber, a spatial coupling system may be used to connect the optical components in a desired polarization state. It is assumed that a non-linear fiber of NON-PMF is used as the non-linear optical media 33 and 34.

An optical signal having electric field components ($E_{X1}$, $E_{Y1}$) is input to the wavelength converter 30. This input optical signal is signal light to be subjected to wavelength conversion, and is, for example, C-band signal light. A subscript "1" of the electric field component indicates that the optical signal has not been subjected to wavelength conversion. The PBS 31 separates the input optical signal into a first polarization and a second polarization. For example, the first polarization including electric field components ($E_{X1}$, 0) transmits through the PBS 31, propagates through a first path P1, and is incident on the non-linear optical medium 33. The non-linear optical medium 33 has a first incident end 331 on which the first polarization is incident. The second polarization including electric field components (0, $E_{Y1}$) is reflected by the PBS 31, propagates through a second path P2, and is incident on the non-linear optical medium 34. The non-linear optical medium 34 has a second incident end 341 on which the second polarization is incident.

As will be described later, excitation light multiplexed with the signal light is incident on the non-linear optical media 33 and 34. The excitation light may be superposed on the signal light in a preceding stage of the PBS 31 and input to the wavelength converter 30, or may be input to the non-linear optical medium in a succeeding stage of the PBS 31. In a case where the excitation light is input in the preceding stage of the PBS 31, the excitation light includes a polarization equally divided by the PBS 31. Polarization axes of the signal light and the excitation light incident on the non-linear optical media 33 and 34 are parallel to each other in the first polarization and the second polarization, respectively.

In the first path P1 from the PBS 31 to the PBC 37, the optical element 35 for polarization correction is arranged between the non-linear optical medium 33 and the PBC 37. In the second path P2 from the PBS 31 to the PBC 37, the optical element 36 for polarization correction is arranged between the non-linear optical medium 34 and the PBC 37.

Output light from the non-linear optical medium 33 includes components of converted light newly generated in a non-linear optical process in addition to components of the signal light and components of the excitation light, and for the sake of simplicity of description, they are collectively treated as the first polarization. The first polarization that has exited the non-linear optical medium 33 includes electric field components ($E_{X2X}$, $E_{X2Y}$) due to an influence of polarization rotation deviation or the like inside the non-linear optical medium 33. A subscript "2" of the electric field component indicates that the optical signal has been subjected to wavelength conversion. Furthermore, X and Y after the subscript "2" indicates electric field components generated during the wavelength conversion.

The first polarization that has exited the non-linear optical medium 33 is incident on the optical element 35 before being multiplexed with the second polarization by the PBC 37, and the unnecessary electric field component $E_{X2Y}$ is removed by the optical element 35. The optical element 35 is arranged so as to transmit the electric field component $E_{X2X}$ and to align a polarization axis of the first polarization incident on the PBC 37 with a reflection polarization axis of the PBC 37. For example, in a case where input and output of the optical element 35 and the PBC 37 are coupled by an optical fiber, they are connected by a polarization maintaining fiber so that a transmission polarization axis of the optical element 35 and the reflection polarization axis of the PBC 37 are aligned. Alternatively, a polarization state between the optical element 35 and the PBC 37 may be adjusted by a spatial optical system to a desired polarization state.

Similarly, output light from the non-linear optical medium 34 includes components of converted light newly generated in a non-linear optical process in addition to components of the signal light and components of the excitation light, and they are collectively treated as the second polarization. The second polarization that has exited the non-linear optical medium 34 includes electric field components ($E_{Y2X}$, $E_{Y2Y}$) due to an influence of polarization rotation deviation or the like inside the non-linear optical medium 34.

The second polarization that has exited the non-linear optical medium 34 is incident on the optical element 36 before being multiplexed with the first polarization by the PBC 37, and the unnecessary electric field component $E_{Y2X}$ is removed by the optical element 36. The optical element 36 is arranged so as to transmit the electric field component $E_{Y2Y}$ and to align a polarization axis of the second polarization incident on the PBC 37 with a transmission polarization axis of the PBC 37. For example, in a case where input and output of the optical element 36 and the PBC 37 are coupled by an optical fiber, they are connected by a polarization maintaining fiber so that a transmission polarization axis of the optical element 36 and the transmission polarization axis of the PBC 37 are aligned. Alternatively, a polarization state between the optical element 36 and the PBC 37 may be adjusted by a spatial optical system to a desired polarization state.

By arranging the optical elements 35 and 36 for polarization correction in the preceding stage of the PBC 37, even in a case where a polarization rotation angle deviates due to an influence of a disturbance or the like, the polarizations may be multiplexed in the optimum polarization state, for example, in the state in which the polarizations are orthogonal to each other. Parallel components that cause interference are removed, and temporal variation of output optical power is suppressed.

As will be described later, it is not always needed to use the individual non-linear optical media 33 and 34 as the non-linear optical media. A single non-linear optical medium may be used and the two polarizations separated by the PBS 31 may be incident on the non-linear optical medium from mutually different incident ends. In this case as well, two separated polarizations may be treated independently of each other. Furthermore, separating and multiplexing the polarizations may be implemented by one PBS.

A polarization rotator or a polarization controller may be arranged between the non-linear optical medium 33 and the optical element 35. The polarization rotator or the polarization controller is arranged so that the axis of the first polarization emitted from the non-linear optical medium 33 is aligned with a polarization axis of the optical element 35 and a polarization axis of the PBC 37. Similarly, a polarization rotator or a polarization controller may be arranged between the non-linear optical medium 34 and the optical element 36. The polarization rotator or the polarization controller is arranged so that the axis of the second polarization emitted from the non-linear optical medium 34 is aligned with a polarization axis of the optical element 36 and the polarization axis of the PBC 37. This configuration may enhance an effect of polarization axis correction by the optical elements 35 and 36.

First Embodiment

Figure 4:
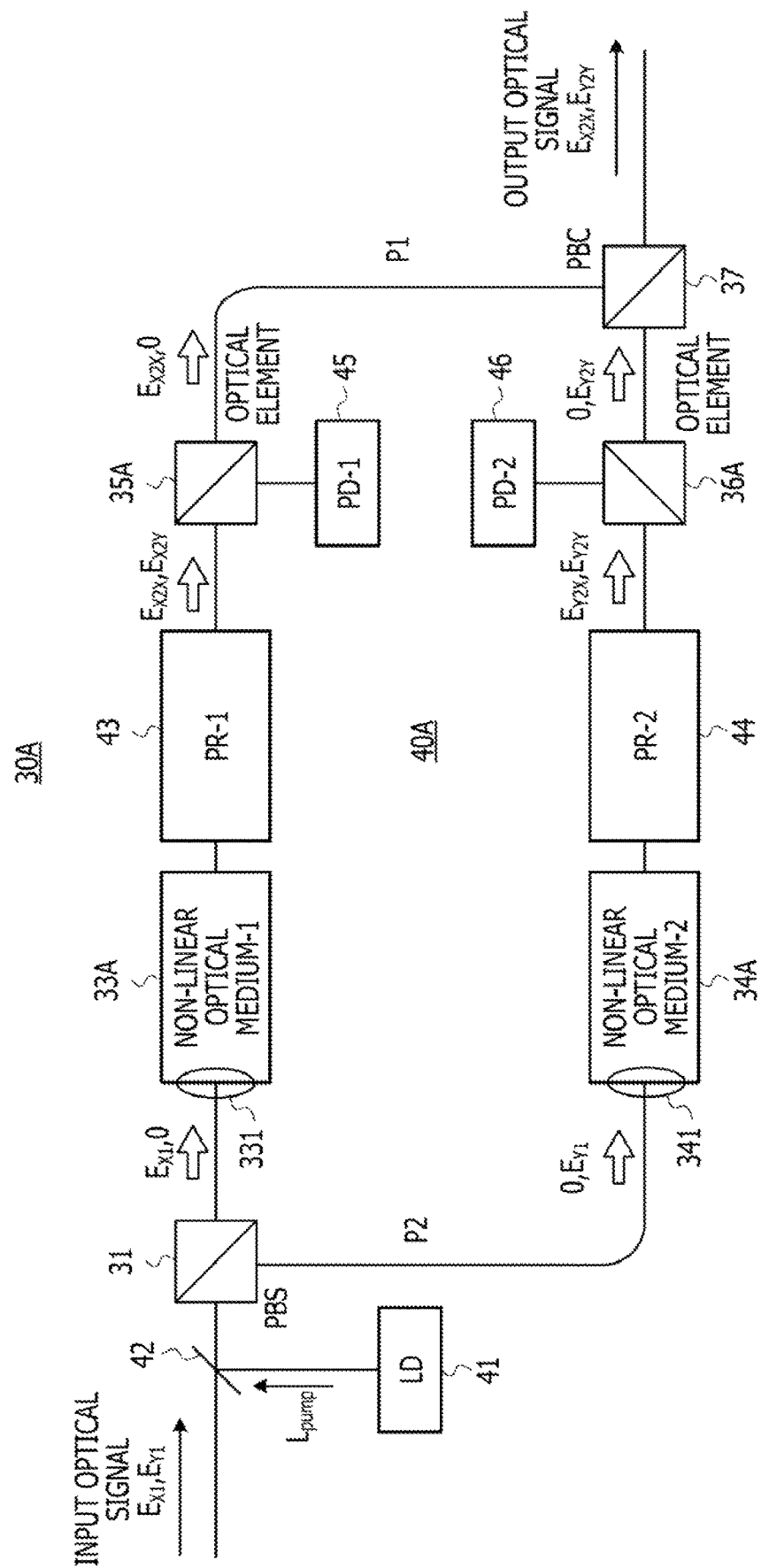
FIG. 4 is a schematic diagram of a wavelength converter of a first embodiment.

FIG. 4 is a schematic diagram of a wavelength converter 30A of a first embodiment. In the first embodiment, a first non-linear optical medium 33A and a second non-linear optical medium 34A are used as non-linear optical media. PBSs are used as optical elements 35A and 36A for polarization correction. Furthermore, a first polarization rotator (referred to as "PR-1" in the drawing) 43 is arranged between the first non-linear optical medium 33A and the optical element 35A, and a second polarization rotator (referred to as "PR-2" in the drawing) 44 is arranged between the second non-linear optical medium 34A and the optical element 36A.

An input optical signal having electric field components ($E_{X1}$, $E_{Y1}$) and excitation light Lpump are superposed by a WDM coupler 42, and incident on a PBS 31. A laser diode (LD) 41, which is an excitation light source, outputs a polarization equally divided by the PBS 31 as the excitation light Lpump. A polarization diversity optical circuit 40A is formed by a first path P1 and a second path P2 from the PBS 31 to a PBC 37.

The PBS 31 separates the input optical signal into a first polarization including the electric field component $E_{X1}$ and a second polarization including the electric field component $E_{Y1}$. Furthermore, the PBS 31 divides the excitation light Lpump at a ratio of 1:1. The first polarization transmitted through the PBS 31 is multiplexed with the excitation light, propagates through the first path P1, and is incident on a first incident end 331 of the first non-linear optical medium 33A. The first polarization is subjected to polarization rotation by the first polarization rotator 43 after being subjected to a non-linear optical effect in the first non-linear optical medium 33A. By this polarization rotation, a main polarization axis of the first polarization is adjusted so as to coincide with a transmission polarization axis of the optical element 35A and a reflection polarization axis of the PBC 37.

The first polarization that has exited the first polarization rotator 43 includes electric field components ($E_{x2X}$, $E_{x2Y}$) due to an influence of polarization rotation deviation or the like in a non-linear optical process. The optical element 35A, which is the PBS, is arranged so as to transmit $E_{x2X}$ of the first polarization that has been subjected to the polarization rotation and to reflect $E_{x2Y}$ of the first polarization. The axis of the first polarization that exits the optical element 35A and is incident on the PBC 37 is aligned with the reflection polarization axis of the PBC 37.

The second polarization reflected by the PBS 31 is multiplexed with the excitation light, propagates through the second path P2, and is incident on a second incident end 341 of the second non-linear optical medium 34A. The second polarization is subjected to polarization rotation by the second polarization rotator 44 after being subjected to a non-linear optical effect in the second non-linear optical medium 34A. By this polarization rotation, a main polarization axis of the second polarization is adjusted so as to coincide with a transmission polarization axis of the optical element 36A and a transmission polarization axis of the PBC 37.

The second polarization that has exited the second polarization rotator 44 includes electric field components ($E_{y2X}$, $E_{y2Y}$) due to an influence of polarization rotation deviation or the like in a non-linear optical process. The optical element 36A, which is the PBS, is arranged so as to transmit $E_{y2Y}$ of the second polarization that has been subjected to the polarization rotation and to reflect $E_{y2X}$ of the second polarization. The axis of the second polarization that exits the optical element 36A and is incident on the PBC 37 is aligned with the transmission polarization axis of the PBC 37.

The $E_{x2Y}$ component reflected by the optical element 35A and the $E_{y2X}$ component reflected by the optical element 36A may be monitored by a first photodetector (referred to as "PD-1" in the drawing) 45 and a second photodetector (referred to as "PD-2" in the drawing) 46, respectively, and used for detecting polarization deviation. Electric output from the first photodetector 45 and the second photodetector 46 may be supplied to a monitor circuit arranged inside or outside a package of the wavelength converter 30A, and used for monitoring polarization deviation, or the like. Alternatively, power of the light incident on each of the first photodetector 45 and the second photodetector 46 may be monitored. A configuration may be adopted in which an alarm is generated when a detected polarization deviation component exceeds a predetermined threshold.

In the wavelength converter 30A, polarizations which are orthogonal to each other and each of which includes converted light, for example, the electric field components $E_{x2X}$ and $E_{x2Y}$ are multiplexed, and temporal variation of output optical power is suppressed.

Second Embodiment

Figure 5:
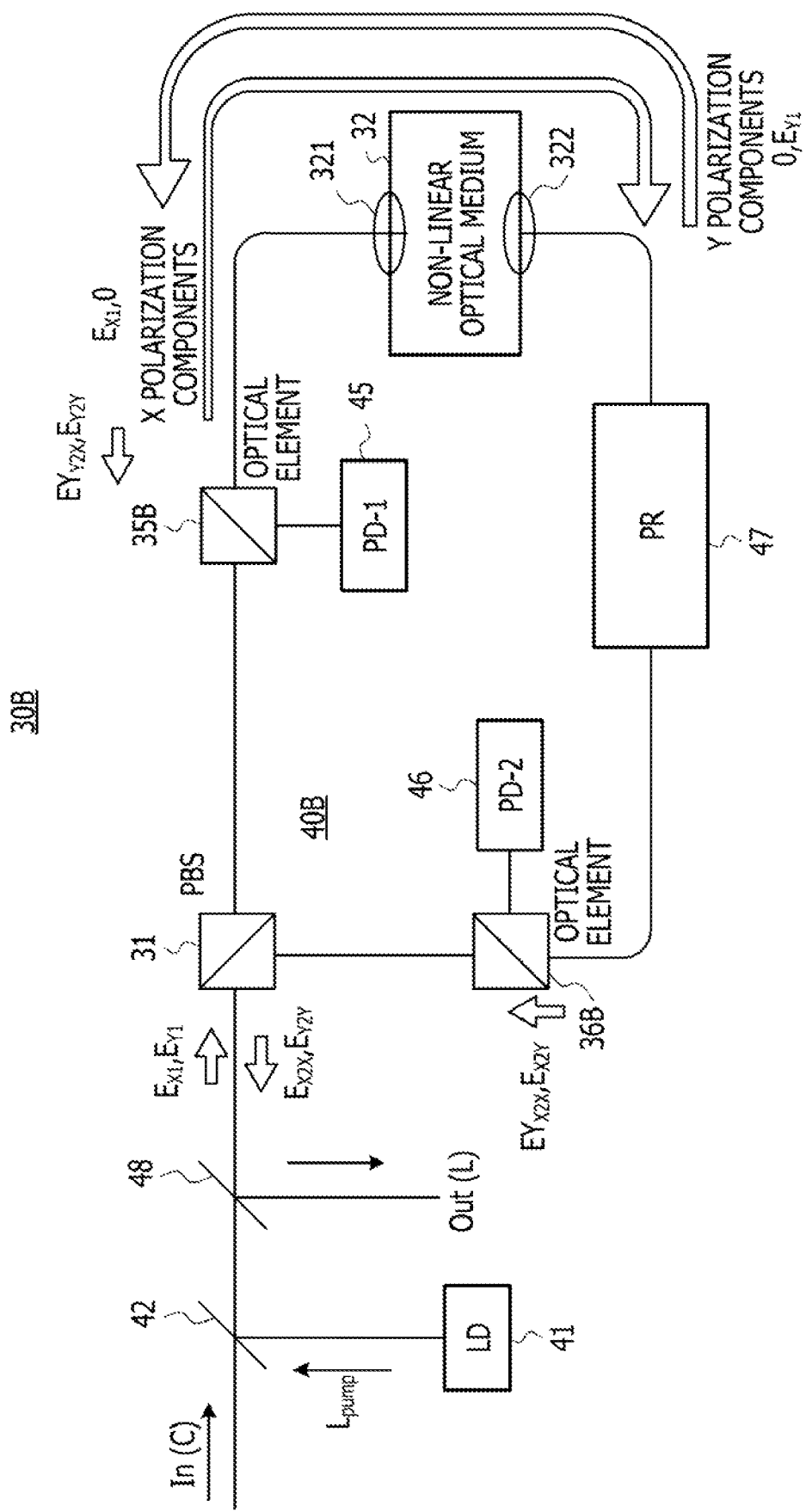
FIG. 5 is a schematic diagram of a wavelength converter of a second embodiment.

FIG. 5 is a schematic diagram of a wavelength converter 30B of a second embodiment. In the second embodiment, one non-linear optical medium 32 is used. An optical element 35B for polarization correction is arranged between a PBS 31 and a first incident end 321 of the non-linear optical medium 32. An optical element 36B for polarization correction is arranged between the PBS 31 and a second incident end 322 of the non-linear optical medium 32. PBSs are used as the optical elements 35B and 36B. A polarization rotator 47 is arranged between the non-linear optical medium 32 and the optical element 35B, or between the non-linear optical medium 32 and the optical element 36B. A polarization diversity optical circuit 40B is formed by a bidirectional loop starting from the PBS 31, passing through the non-linear optical medium 32, and returning to the PBS 31. The PBS 31 functions as a PBS for light incident on the polarization diversity optical circuit 40B, and functions as an optical multiplexer, for example, a PBC for a first polarization and a second polarization after circulating the loop.

The input optical signal in a certain wavelength band (for example, C-band) having electric field components ($E_{X1}$, $E_{Y1}$) is superposed with excitation light Lpump by a WDM coupler 42, is transmitted through a WDM coupler 48, and is incident on the PBS 31. An LD 41, which is an excitation light source, emits a polarization transmitted through the WDM coupler 48 and equally divided by the PBS 31, as the excitation light Lpump.

The PBS 31 separates the input optical signal into the first polarization including the electric field component $E_{X1}$ and the second polarization including the electric field component $E_{Y1}$. Furthermore, the PBS 31 divides the excitation light Lpump at a ratio of 1:1. The first polarization transmitted through the PBS 31 propagates in the loop in a clockwise direction, is transmitted through the optical element 35B as it is, and is incident on the first incident end 321 of the non-linear optical medium 32 to be subjected to a non-linear optical effect. The first polarization that has exited the non-linear optical medium includes electric field components ($E_{x2X}$, $E_{x2Y}$) due to an influence of polarization rotation deviation or the like. The first polarization including a component of converted light is rotated by 90° by the polarization rotator 47 and is incident on the optical element 36B. Due to this polarization rotation, an axis of the first polarization is aligned with a transmission polarization axis of the optical element 36B, and is aligned with a reflection polarization axis of the PBS 31.

The optical element 36B, which is the PBS, is arranged so as to transmit $E_{x2X}$ of the first polarization rotated by 90° and to reflect $E_{x2Y}$ of the first polarization. The electric field component reflected by the optical element 36B may be monitored by a second photodetector 46 as a polarization deviation component.

In the input light to the polarization diversity optical circuit 40B, the second polarization reflected by the PBS 31 propagates in the loop in a counterclockwise direction, and is transmitted through the optical element 36B as it is. The second polarization is rotated by 90° by the polarization rotator 47, and is incident on the second incident end 322 of the non-linear optical medium 32. The second polarization subjected to a non-linear optical effect includes electric field components ($E_{y2X}$, $E_{y2Y}$) due to an influence of polarization rotation deviation or the like.

The optical element 35B, which is the PBS, is arranged so as to transmit $E_{y2Y}$ of the second polarization rotated by 90° and to reflect $E_{y2X}$ of the second polarization. With this configuration, the electric field component $E_{y2Y}$ aligned with a transmission polarization axis of the PBS 31 is incident on a transmission port of the PBS 31. The electric field component reflected by the optical element 35B may be monitored by a first photodetector 45 as a polarization deviation component.

The first polarization and the second polarization after wavelength conversion are multiplexed by the PBS 31. In the first polarization and the second polarization, which circulate in the loop of the polarization diversity optical circuit 40B in mutually opposite directions and return to the PBS 31, parallel components that cause interference are removed or reduced, and the orthogonal electric field components $E_{X2X}$ and $E_{Y2Y}$ are multiplexed. In the multiplexed light, signal light and excitation light are transmitted through the WDM coupler 48. Converted light converted to another wavelength band (for example, L-band) is reflected by the WDM coupler 48, and output from the wavelength converter 30B as output light Out.

By the wavelength converter 30B of the second embodiment, two polarizations orthogonal to each other are multiplexed in the optimum state, and temporal variation of output optical power is suppressed.

Third Embodiment

Figure 6:
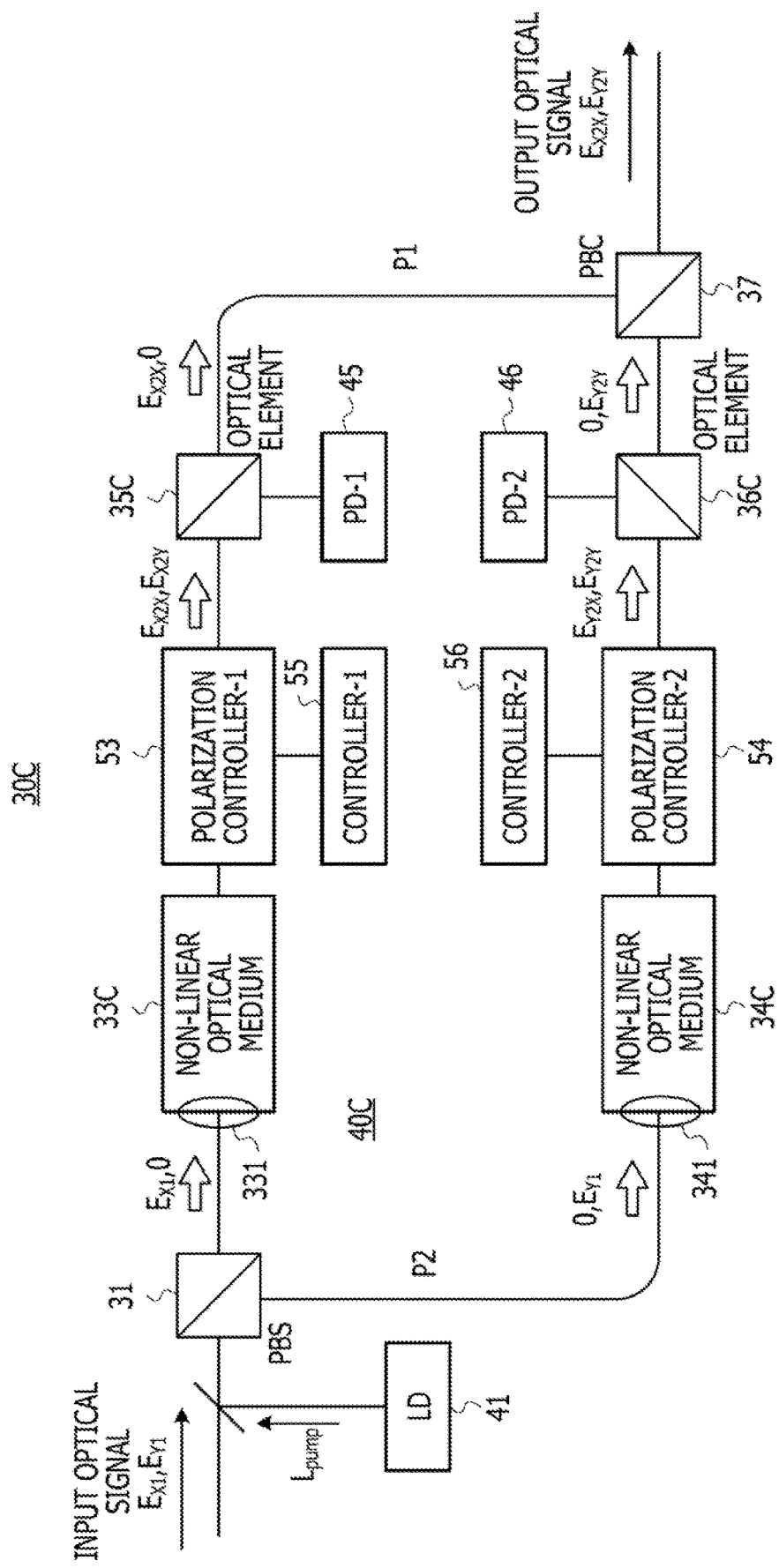
FIG. 6 is a schematic diagram of a wavelength converter of a third embodiment.

FIG. 6 is a schematic diagram of a wavelength converter 30C of a third embodiment. In the third embodiment, a result of monitoring electric field components removed by optical elements 35C and 36C of a polarization diversity optical circuit 40C is used for feedback control.

A first polarization controller (referred to as "polarization controller-1" in the drawing) 53 is arranged between a first non-linear optical medium 33C and the optical element 35C for polarization correction. Electric output of a first photodetector 45 that detects the component removed by the optical element 35C is fed back to a first controller (referred to as "controller-1" in the drawing) 55. The first controller 55 controls a polarization axis of the first polarization controller 53 so that polarization deviation detected by the first photodetector 45 is minimized.

A second polarization controller (referred to as "polarization controller-2" in the drawing) 54 is arranged between a second non-linear optical medium 34C and the optical element 36C for polarization correction. Electric output of a second photodetector 46 that detects the component removed by the optical element 36C is fed back to a second controller (referred to as "controller-2" in the drawing) 56. The second controller 56 controls a polarization axis of the second polarization controller 54 so that polarization deviation detected by the second photodetector 46 is minimized.

The first polarization controller 53 and the second polarization controller 54 may be, for example, a combination of a half-wave plate and a quarter-wave plate. The first controller and the second controller may be a microprocessor or a logic device such as a field programmable gate array (FPGA). The first controller 55 and the second controller 56 may adjust a polarization axes rotation mechanism of the half-wave plate and the quarter-wave plate on the basis of output of the first photodetector 45 and output of the second photodetector 46.

By performing feedback control of the first polarization controller 53 and the second polarization controller 54, power of $E_{X2X}$ transmitted through the optical element 35C and power of $E_{Y2Y}$ transmitted through the optical element 36C are maintained at the maximum. The feedback configuration of the third embodiment has the same effect as an active operation of the first polarization rotator 43 and the second polarization rotator 44 of the first embodiment. Other configurations are the same as those in the first embodiment, and the same components are denoted by the same reference signs and duplicate description will be omitted.

The wavelength converter 30C of the third embodiment may multiplex polarizations orthogonal to each other with the maximum power even in a case where a polarization state deviates from the optimum state due to an influence of a disturbance or the like. Temporal variation of output optical power is suppressed, and output power may be maintained high.

Fourth Embodiment

Figure 7:
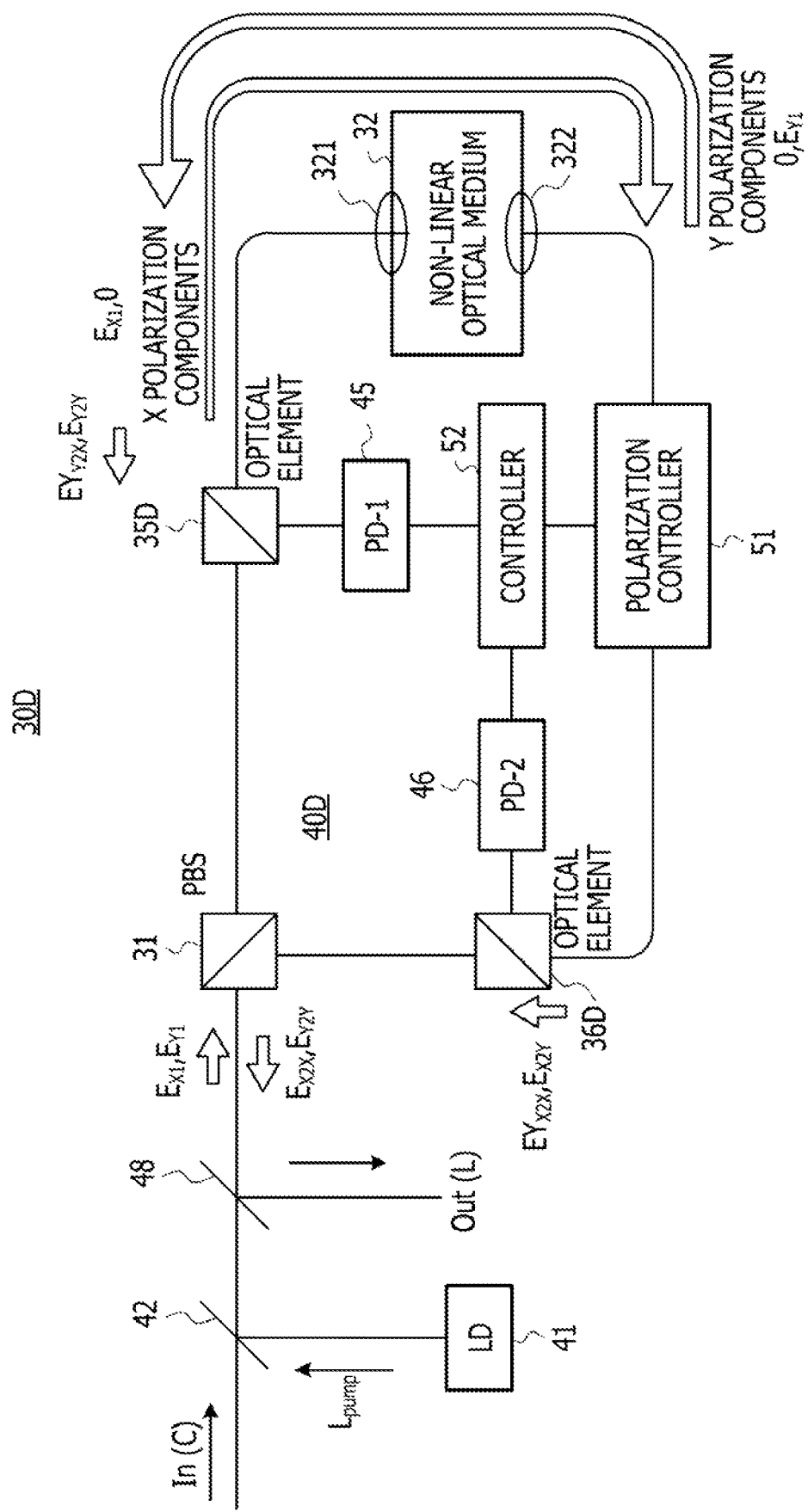
FIG. 7 is a schematic diagram of a wavelength converter of a fourth embodiment.

FIG. 7 is a schematic diagram of a wavelength converter 30D of a fourth embodiment. In the fourth embodiment, a result of monitoring electric field components removed by optical elements 35D and 36D of a polarization diversity optical circuit 40D is used for feedback control.

In the polarization diversity optical circuit 40D formed by a bidirectional loop, a polarization controller 51 is arranged between either one of the optical elements 35D and 36D for polarization correction and a non-linear optical medium 32. Output of a first photodetector 45 connected to a reflection port of the optical element 35D and output of a second photodetector 46 connected to a reflection port of the optical element 36D are supplied to a controller 52.

The controller 52 controls directions of polarization axes of optical elements constituting the polarization controller 51 so that detection results of the first photodetector 45 and the second photodetector 46 are minimized. The control may be to minimize the sum of the electric output of the first photodetector 45 and the electric output of the second photodetector 46, or to apply a weighting coefficient to at least one of the two electric outputs.

By polarization control by the polarization controller 51, an axis of a first polarization that circulates in the loop clockwise and returns to a PBS 31 is aligned with a transmission polarization axis of the optical element 36D and is aligned with a reflection polarization axis of the PBS 31. Furthermore, an axis of a second polarization that circulates in the loop counterclockwise and returns to the PBS 31 is aligned with a transmission polarization axis of the optical element 35D and is aligned with a transmission polarization axis of the PBS 31.

The feedback configuration of the fourth embodiment has the same effect as an active operation of the polarization rotator 47 of the second embodiment. Other configurations are the same as those in the second embodiment, and the same components are denoted by the same reference signs and duplicate description will be omitted. In the wavelength converter 30D of the fourth embodiment, polarizations orthogonal to each other are multiplexed with high power even in a case where a polarization state deviates from the optimum state due to an influence of a disturbance or the like, and temporal variation of output optical power is suppressed.

[Feedback Control Based on Monitor Light]

Figure 8:
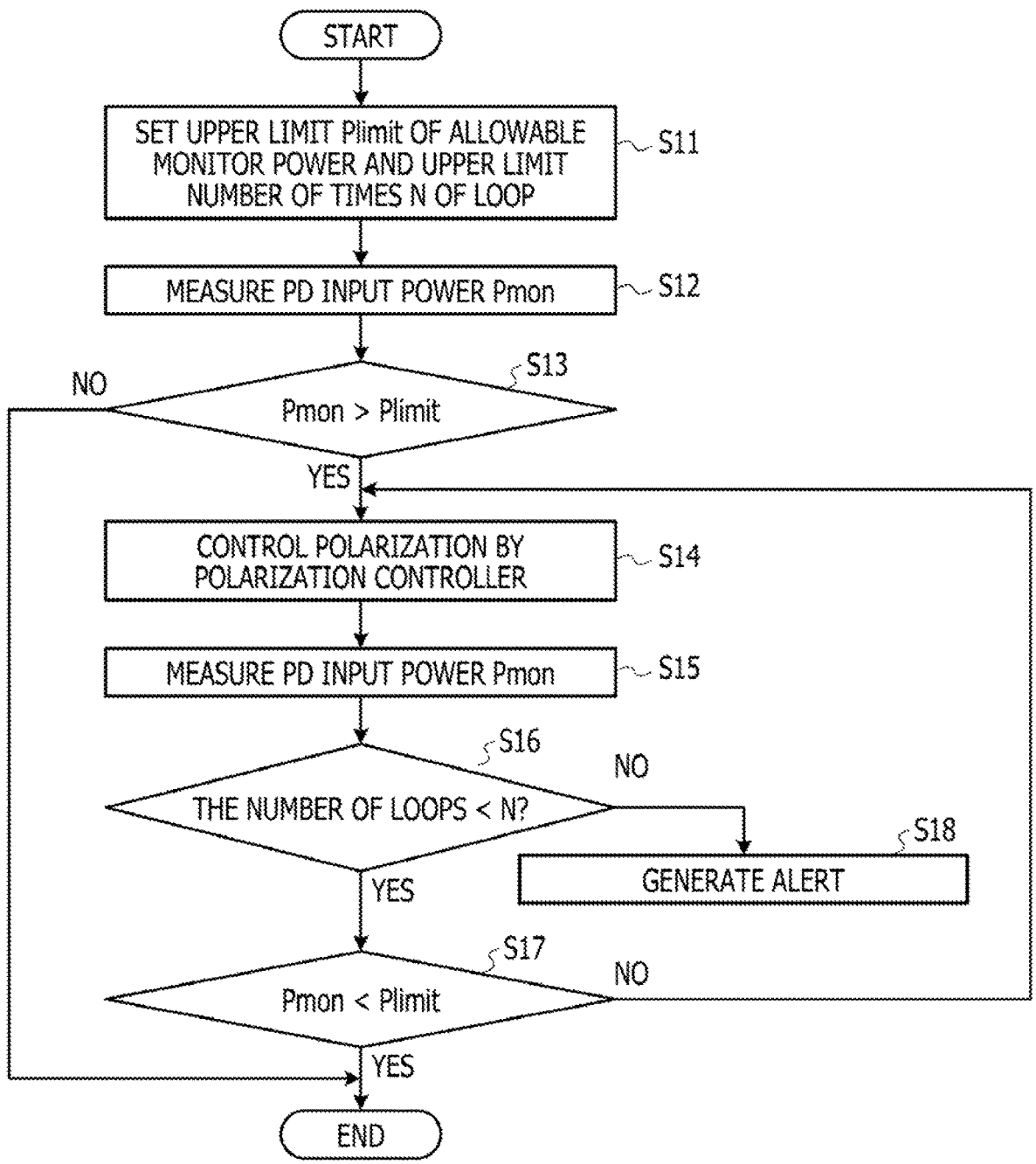
FIG. 8 is a flowchart of feedback control based on monitor light.

FIG. 8 is a flowchart of feedback control based on monitor light. This control flow is processing in the feedback loops of FIGS. 6 and 7. In the first controller 55 and the second controller 56 in FIG. 6 or the controller 52 in FIG. 7, an upper limit Plimit of allowable monitor power and the upper limit number of times N of a control loop are set in advance (S11).

The upper limit of the allowable monitor power is an upper limit of power detected by the first photodetector 45 and the second photodetector 46. When polarization deviation components detected by the first photodetector 45 and the second photodetector 46 are less than or equal to Plimit, power of converted light that is multiplexed and output by the PBC 37 or the PBS 31 may be maintained at an allowable level or above. In the following, the configuration of FIG. 7 will be described as an example, but the same control flow applies to the feedback control of FIG. 6.

During service, power Pmon of light incident from the optical element 35D and the optical element 36D is measured by the first photodetector 45 and the second photodetector 46, respectively (S12), and it is determined whether or not the measured power Pmon exceeds the upper limit Plimit (S13). When the power Pmon of the measurement light does not exceed the upper limit Plimit of allowable polarization deviation (No in S13), it is determined that a proper operation is performed, and the processing ends until the next monitoring timing.

When the power Pmon of the measurement light exceeds the upper limit Plimit (Yes in S13), it means that polarization deviation has increased beyond an allowable range. In this case, the controller 52 adjusts a polarization axis of the polarization controller 51 (S14). After adjusting the polarization axis of the polarization controller 51, the power Pmon of the input light to the PDs is measured again (S15). Next, it is determined whether the number of control loops is less than N (S16). When the number of control loops reaches N (No in S16), an alert is generated because the polarization deviation is not resolved in spite of a predetermined number of times of polarization control (S18).

When the number of control loops is less than N (Yes in S16), it is determined whether or not the power Pmon of the monitor light becomes smaller than the upper limit Plimit (S17), and when Pmon<Plimit holds, the processing ends. In a case where the power Pmon of the monitor light does not become smaller than the upper limit Plimit (No in S17), the processing returns to Step S14, a direction of the polarization axis of the polarization controller 51 is controlled in an opposite direction, and Steps S15 to S17 are repeated within a range where the number of control loops is N or less.

By the feedback control of FIG. 8, even in a case where a polarization rotation angle of the non-linear optical medium deviates due to an influence of a disturbance or the like during service, control is performed in a direction in which polarization deviation is reduced, and temporal variation of output power of converted light is suppressed.

[Confirmation of Effects]

Figure 9:
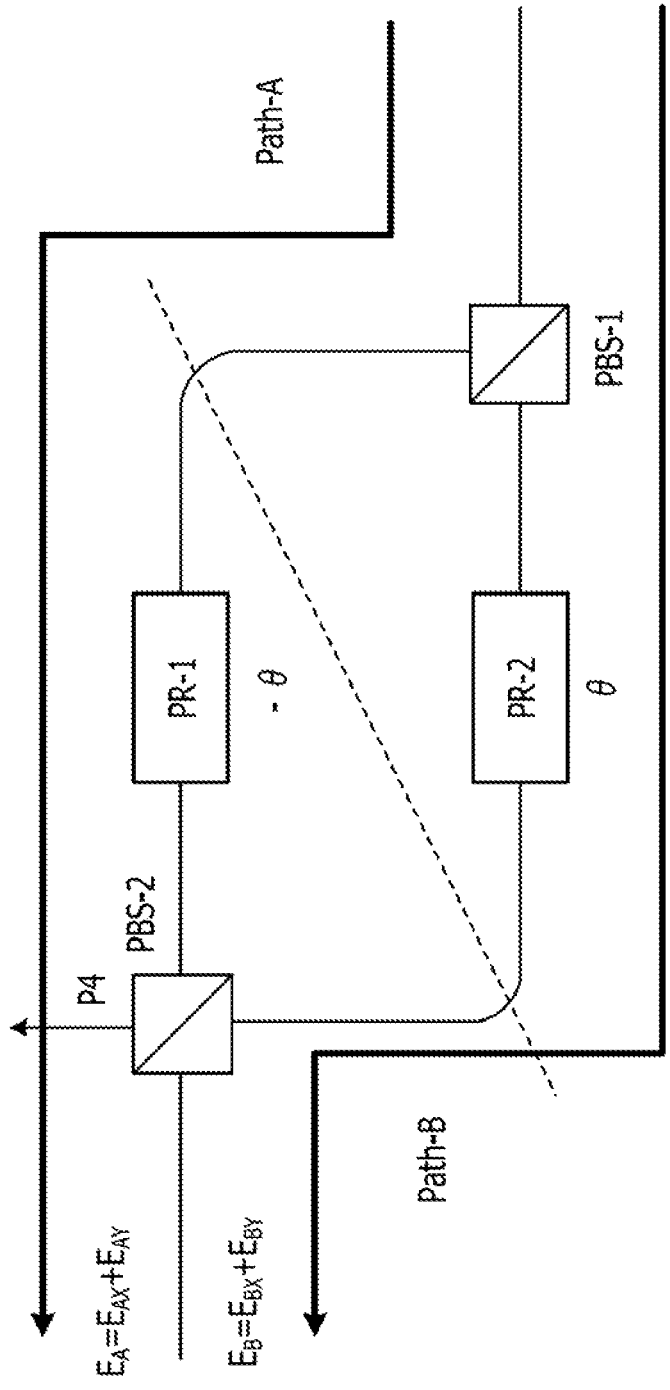
FIG. 9 is an analysis model diagram of a polarization diversity optical circuit.

FIG. 9 is an analysis model diagram for confirming effects of the configurations of the embodiments. The analysis model diagram of FIG. 9 simulates a polarization diversity optical circuit without an optical element for polarization correction. Input light is demultiplexed into two polarizations by a PBS-1. A first polarization is subjected to polarization rotation by a PR-1 in a path A, and a second polarization is subjected to polarization rotation by a PR-2 in a path B. An electric field component $E_A$ ($E_A = E_{AX} + E_{AY}$) of the light incident in the path A and an electric field component $E_B$ ($E_B = E_{BX} + E_{BY}$) of the light incident in the path B are multiplexed and output by a PBS-2.

The paths A and B of the analysis model of FIG. 9 are represented by Jones matrices of FIG. 9. In the paths A and B, matrices on the right side represent the PBS-1, matrices on the left side represent the PBS-2, and matrices in the middle represent the polarization rotators PR. In the matrices, "ER" indicates a polarization extinction ratio of the PBS. Subscripts "R" and "T" represent reflection and transmission of the PBS.

In the path A, the polarization reflected by the PBS-1 is rotated by 90° in a negative direction by the PR-1 and incident on a transmission port of the PBS-2. In the path B, the polarization transmitted through the PBS-1 is rotated by 90° in a positive direction by the PR-2 and incident on a reflection port of the PBS-2.

The light incident on the PBS-2 in the path A may also include a component reflected by a fourth port P4 of the PBS-2. The light incident on the PBS-2 in the path B may also include a component transmitted through the fourth port P4 of the PBS-2. The light output from the fourth port P4 of the PBS-2 is an interference light component unnecessary for wavelength conversion using the polarization diversity optical circuit.

Figure 10:
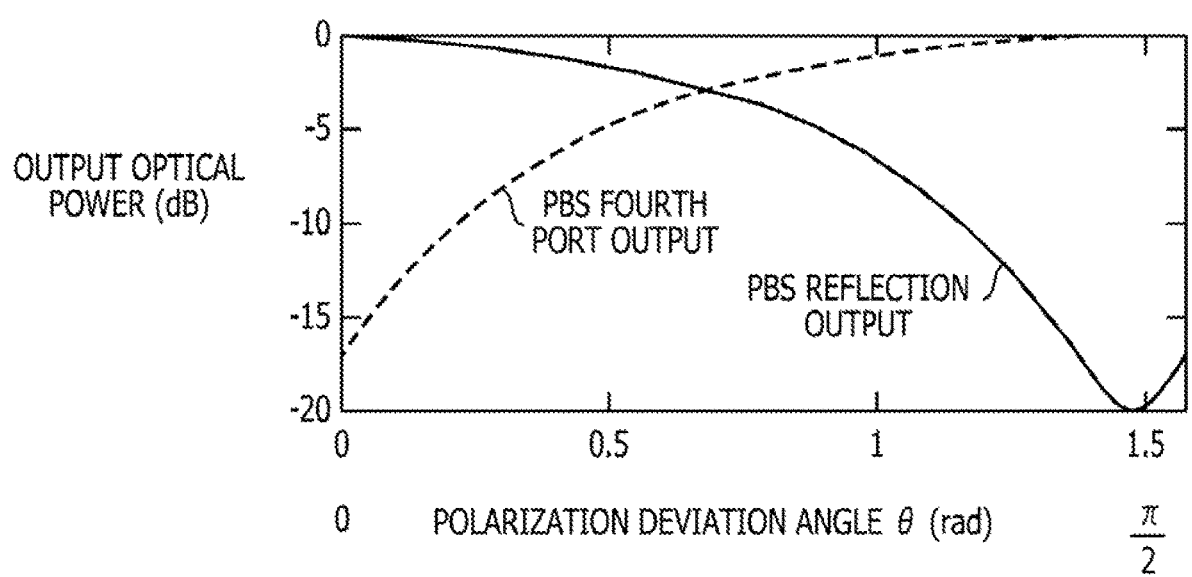
FIG. 10 is a diagram illustrating a change in the output optical power due to polarization angle deviation in a loop.

FIG. 10 illustrates a change in output optical power due to polarization angle deviation in the analysis model of FIG. 9. A solid line is power of output light in which $E_A$ and $E_B$ are multiplexed by the PBS-2. In FIG. 10, the power is referred to as "PBS reflection output", focusing on the path B. A broken line is output power of the fourth port P4 of the PBS-2. The PBS reflection output is high when polarization angle deviation in a loop is small. However, as the polarization angle deviation increases, power of the target light decreases, and when the polarization angle deviation is $\pi/2$ radians, the PBS reflection output becomes zero.

On the other hand, the unnecessary component output from the fourth port P4 increases as the polarization angle deviation in the loop increases, and becomes maximum at the polarization angle deviation of $\pi/2$ radians. An intersection of the solid line and the broken line, for example, the polarization angle deviation when the target output light and the unnecessary component observed at the fourth port P4 are at the same level is $\pi/4$ radians.

According to the verification so far, even when a polarization state of a polarization diversity optical circuit is optimally adjusted at the time of shipment, it is estimated that polarization angle deviation of about 0.2 to 0.5 radians occurs due to an influence of a disturbance or the like during use. When a polarization maintaining (PM) non-linear fiber is used, the polarization angle deviation does not become so large. However, since a non-polarization maintaining (NON-PM) non-linear fiber that may produce required wavelength dispersion characteristics with good reproducibility is used, the polarization angle deviation becomes large.

In the embodiments, an optical element for polarization correction is arranged in front of the PBS-2 to reduce the polarization angle deviation in the loop. To maximize the power of the target output light, it is desirable that the polarization angle deviation be made smaller than 0.2 radians (for example, power deviation be made less than 0.2 dB).

Focusing on the curve of the solid line in FIG. 10, it is difficult to monitor an output port and control the polarization angle deviation to less than 0.2 radians. Since a change in the unnecessary component of the broken line is larger, it is possible to control the polarization angle deviation more accurately by monitoring the output light from the fourth port P4. On the basis of this analysis result, in the configurations of FIGS. 4 to 7, the PBSs are used as the optical elements, and the photodetectors (PDs) are arranged at the reflection ports of the PBSs to detect the polarization angle deviation.

Figure 11:
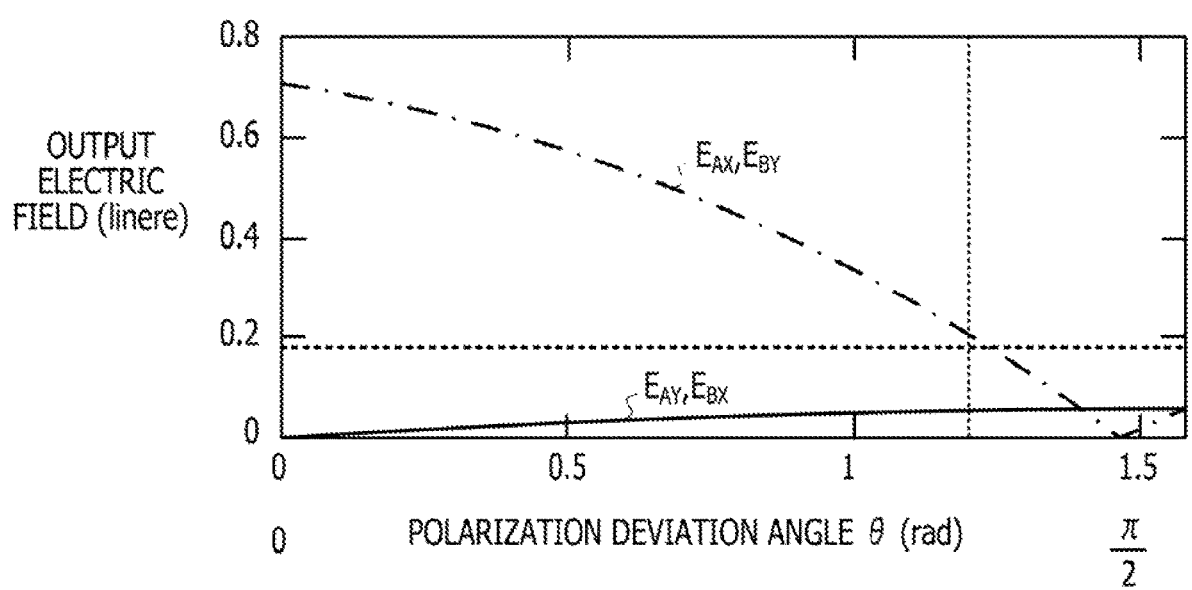
FIG. 11 is a diagram illustrating a change in an interference electric field due to the polarization angle deviation in the loop when an extinction ratio of a polarization beam splitter (PBS) is 20 dB.
Figure 12:
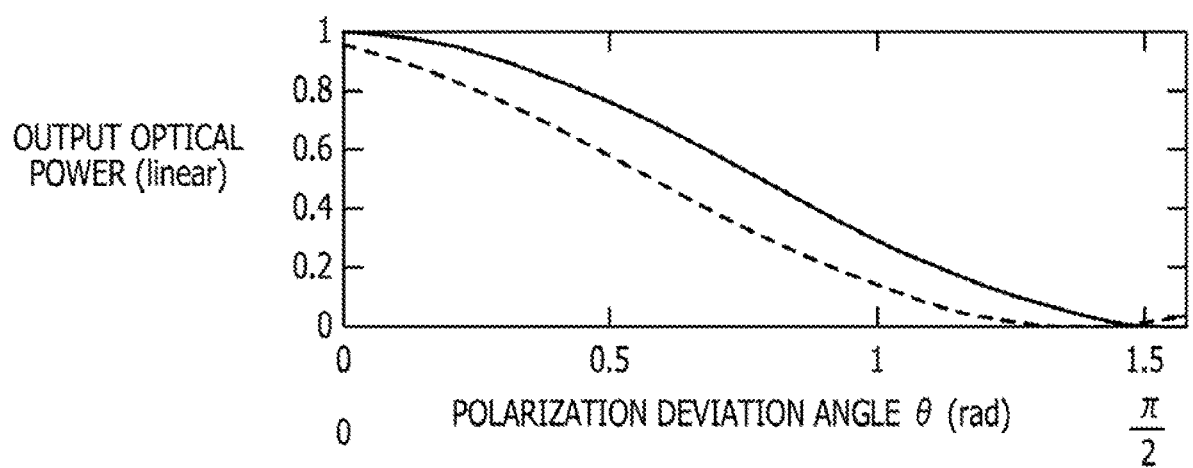
FIG. 12 is a diagram illustrating a change in the output optical power due to the polarization angle deviation in the loop when the extinction ratio of the PBS is 20 dB.

FIG. 11 illustrates a change in an interference electric field due to the polarization angle deviation in the loop when an extinction ratio of the PBS is 20 dB. FIG. 12 illustrates a change in output optical power due to the polarization angle deviation in the loop when the extinction ratio of the PBS is 20 dB. In FIG. 11, a horizontal axis is an angle (radian) and a vertical axis is an output electric field normalized to "1".

An alternate long and short dash line is electric field components $E_{AX}$ and $E_{BY}$ of a target polarization extracted from the PBS-2. A solid line is unnecessary electric field components $E_{AY}$ and $E_{BX}$ output from the fourth port of the PBS-2. Subscripts A and B indicate the paths A and B of the analysis model of FIG. 9, and X and Y indicate polarization components.

In the PBS with a finite polarization extinction ratio, $E_{AX}$ and $E_{BX}$ interfere with each other, and $E_{AY}$ and $E_{BY}$ interfere with each other. When a polarization rotation angle deviates, a degree of interference, for example, a difference between the alternate long and short dash line and the solid line itself varies. The change in the degree of interference causes temporal variation of output optical power of the wavelength converter.

The electric field component $E_A$ transmitted through the path A is more accurately represented by the Jones matrices in FIG. 9 as follows.

$$E_A = \begin{bmatrix} \sqrt{1-ER_{T2}} & 0 \\ 0 & \sqrt{ER_{T2}} \end{bmatrix}$$

$$\begin{bmatrix} \cos\left(-\theta-\frac{\pi}{2}\right) & -\sin\left(-\theta-\frac{\pi}{2}\right) \\ \sin\left(-\theta-\frac{\pi}{2}\right) & \cos\left(-\theta-\frac{\pi}{2}\right) \end{bmatrix} \begin{bmatrix} \sqrt{ER_{R1}} & 0 \\ 0 & \sqrt{1-ER_{R1}} \end{bmatrix} E_I$$

$$E_A = \begin{bmatrix} -\sqrt{1-ER_{T2}}\sqrt{ER_{R1}}\sin\theta & \sqrt{1-ER_{T2}}\sqrt{1-ER_{R1}}\cos\theta \\ -\sqrt{ER_{T2}}\sqrt{ER_{R1}}\cos\theta & -\sqrt{ER_{T2}}\sqrt{1-ER_{R1}}\sin\theta \end{bmatrix} E_I$$

[Expression 1]

Here, $E_I$ is an input electric field to the polarization diversity optical circuit of the analysis model, $ER_{R1}$ is a polarization extinction ratio of a reflection port of the PBS-1, $\theta$ is a polarization rotation amount of the first polarization rotator, and $ER_{T2}$ is a polarization extinction ratio of the transmission port of the PBS-2. Similarly, the electric field component $E_B$ transmitted through the path B is more accurately represented as follows.

$$E_B = \begin{bmatrix} \sqrt{ER_{R2}} & 0 \\ 0 & \sqrt{1-ER_{R2}} \end{bmatrix}$$

$$\begin{bmatrix} \cos\left(\theta+\frac{\pi}{2}\right) & -\sin\left(\theta+\frac{\pi}{2}\right) \\ \sin\left(\theta+\frac{\pi}{2}\right) & \cos\left(\theta+\frac{\pi}{2}\right) \end{bmatrix} \begin{bmatrix} \sqrt{1-ER_{T1}} & 0 \\ 0 & \sqrt{ER_{T1}} \end{bmatrix} E_I$$

$$E_B = \begin{bmatrix} -\sqrt{ER_{R2}}\sqrt{1-ER_{T1}}\sin\theta & -\sqrt{1-ER_{R2}}\sqrt{1-ER_{T1}}\cos\theta \\ \sqrt{ER_{R2}}\sqrt{ER_{T1}}\cos\theta & -\sqrt{1-ER_{R2}}\sqrt{ER_{T1}}\sin\theta \end{bmatrix} E_I$$

[Expression 2]

$ER_{T1}$ is a polarization extinction ratio of a transmission port of the PBS-1, $\theta$ is a polarization rotation amount of the second polarization rotator, and $RR_{R2}$ is a polarization extinction ratio of the reflection port of the PBS-2. Assuming that the input electric field $E_I$ is a linear polarization tilted by 45 degrees with respect to a polarization axis of the PBS-1, $E_A$ and $E_B$ are represented as follows.

$$E_A = \frac{1}{\sqrt{2}} \begin{bmatrix} -\sqrt{1-ER_{T2}}\sqrt{ER_{R1}}\sin\theta + \sqrt{1-ER_{T2}}\sqrt{1-ER_{R1}}\cos\theta \\ -\sqrt{ER_{T2}}\sqrt{ER_{R1}}\cos\theta - \sqrt{ER_{T2}}\sqrt{1-ER_{R1}}\sin\theta \end{bmatrix} E_I$$

$$E_B = \frac{1}{\sqrt{2}} \begin{bmatrix} -\sqrt{ER_{R2}}\sqrt{1-ER_{T1}}\sin\theta - \sqrt{1-ER_{R2}}\sqrt{1-ER_{T1}}\cos\theta \\ \sqrt{ER_{R2}}\sqrt{ER_{T1}}\cos\theta - \sqrt{1-ER_{R2}}\sqrt{ER_{T1}}\sin\theta \end{bmatrix} E_I$$

[Expression 3]

FIG. 11 is a plot of electric field intensity of each component with respect to angular deviation of polarization rotation (referred to as "polarization deviation angle"), assuming that $ER_{R1}=ER_{T2}=ER_{T1}=ER_{R2}=0.01$.

When the polarization deviation angle is $\theta=0$, which is the optimum state, the unnecessary components $E_{AY}$ and $E_{BX}$ are not generated, but as $\theta$ increases, the unnecessary components $E_{AY}$ and $E_{BX}$ increase.

In FIG. 12, a solid line indicates strengthening interference $|E_A-E_B|$, and a broken line indicates weakening interference $|E_A+E_B|$. As in FIG. 11, the optimum state is obtained when $\theta=0$, where there is no difference in optical power due to the interference state, but as $\theta$ increases, a difference in optical power due to the interference state increases. Therefore, an amplitude of optical power variation generated by the interference becomes large.

Figure 13:
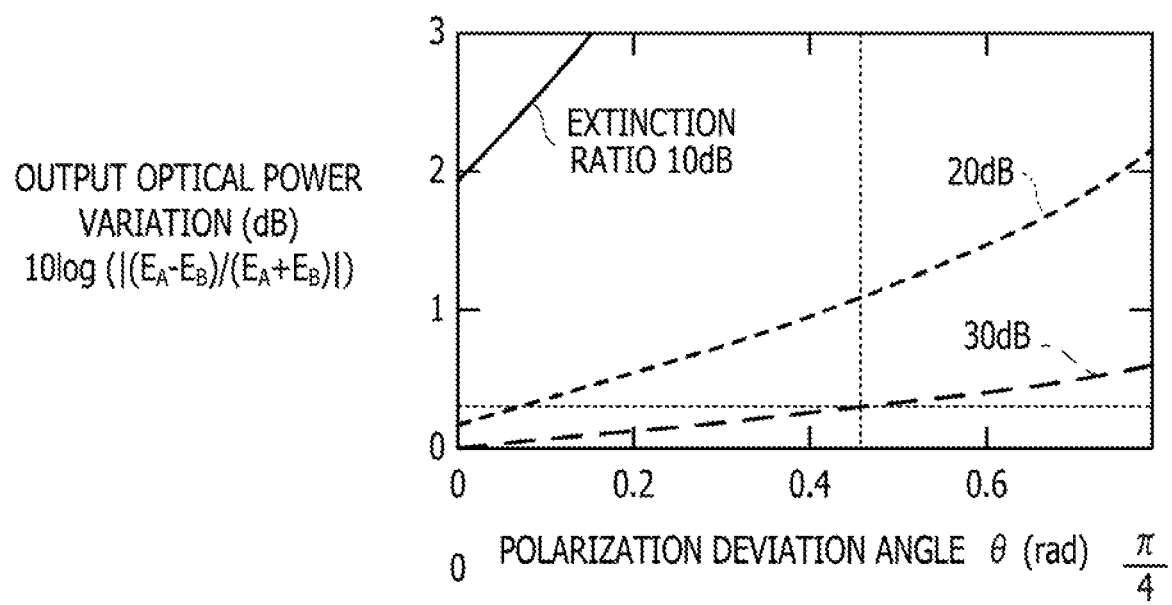
FIG. 13 is a diagram illustrating extinction ratio dependency of output optical power variation due to polarization angle deviation.

FIG. 13 illustrates extinction ratio dependency of output optical power variation due to the polarization angle deviation. A vertical axis indicates the output optical power variation (dB). The output optical power variation is represented by $10\log(|(E_A-E_B)/(E_A+E_B)|)$. A range of angular deviation of polarization rotation is set to 0 to $\pi/4$ radians.

The lower an extinction ratio, the greater the output optical power variation. An effective extinction ratio of the PBS, which is said to have a relatively high polarization extinction ratio, is 29 to 34 dB for transmission and 24 to 30 dB for reflection. Focusing on a broken line of 30 dB, the output optical power variation becomes remarkable when the angular deviation of the polarization rotation exceeds 0.5 radians.

Figure 14:
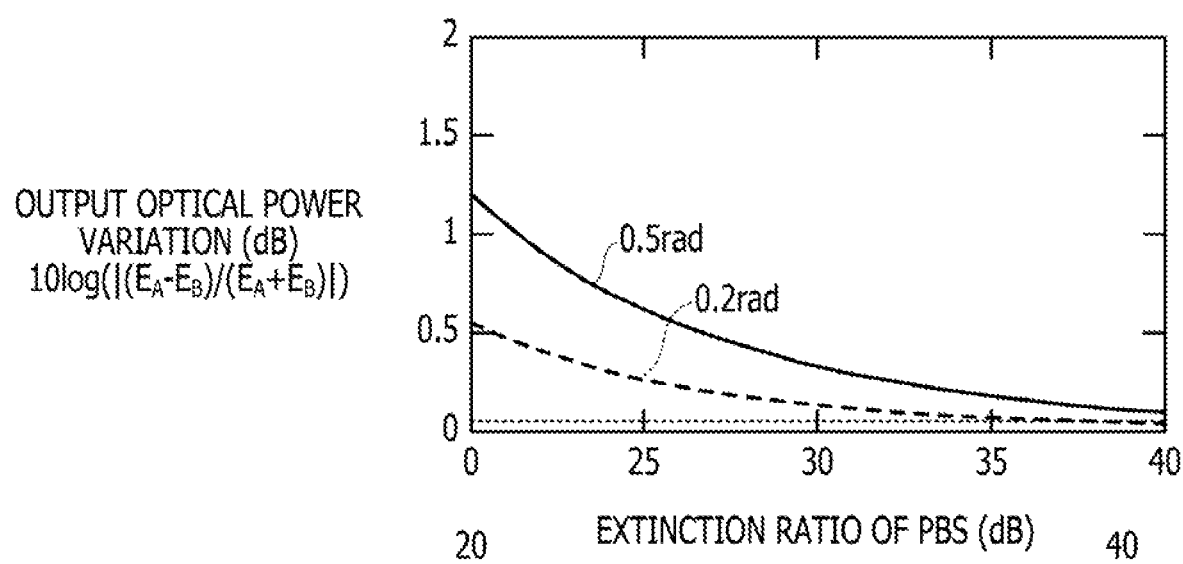
FIG. 14 is a diagram illustrating deviation angle dependency of the output optical power variation due to the extinction ratio of the PBS.

FIG. 14 illustrates polarization deviation angle dependency of the output optical power variation due to the extinction ratio of the PBS. A horizontal axis is the polarization extinction ratio of the PBS. In a case where the polarization extinction ratio is 20 dB and the deviation angle of the polarization rotation is 0.5 radians, the output optical power variation exceeds 1 dB. Even in the same PBS, the output optical power variation may be reduced to less than half by setting the deviation angle of the polarization rotation to 0.2 radians. This tendency is true even in a case where the polarization extinction ratio of the PBS is high. Thus, in the embodiments, regardless of the types of the PBSs used in the polarization diversity optical circuit, the optical elements for polarization correction are used to reduce the angular deviation of the polarization rotation.

Figure 15:
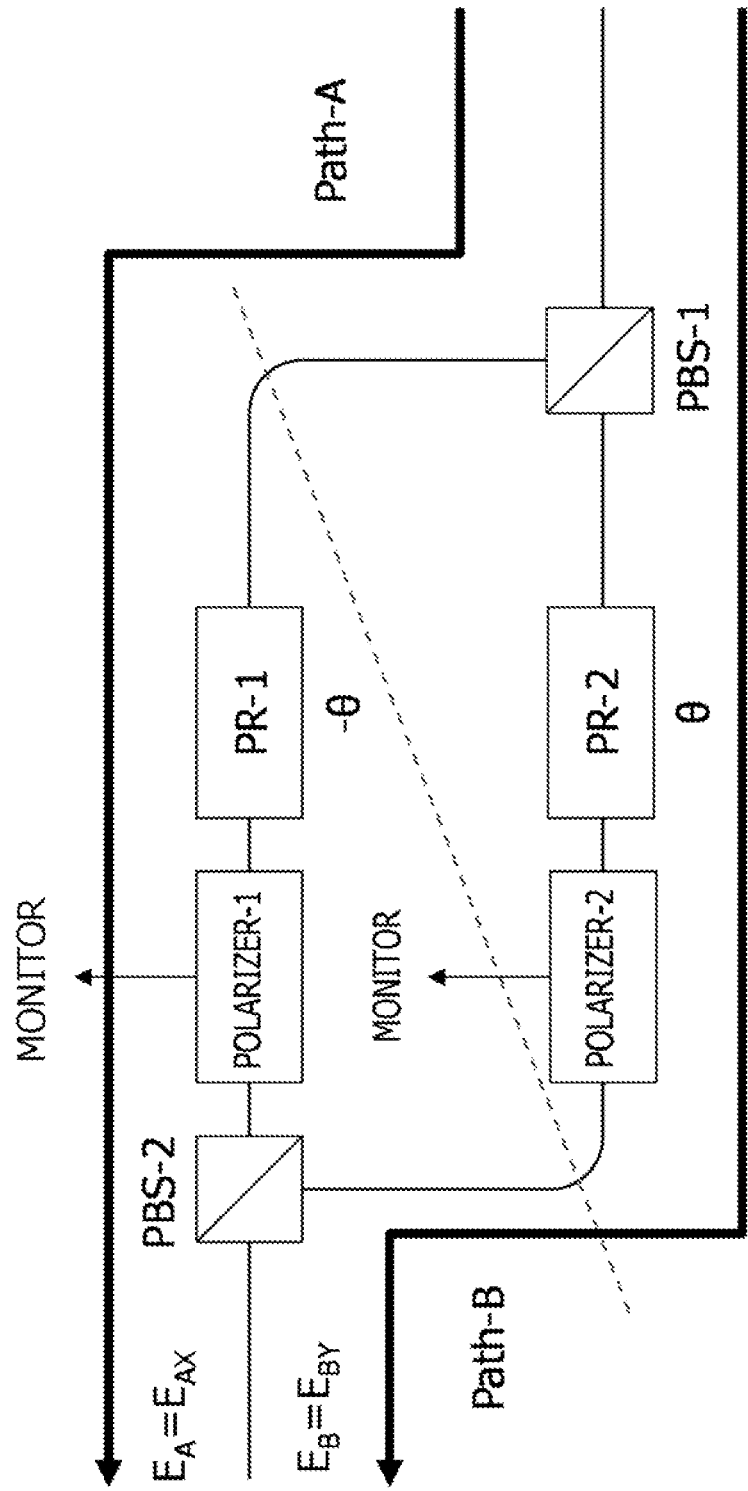
FIG. 15 is an analysis model diagram when a polarizer is added in the loop.

FIG. 15 is an analysis model diagram of an embodiment in which polarizers are inserted in front of an optical multiplexer (PBC). Input light is demultiplexed into two polarizations by a PBS-1. A first polarization is subjected to polarization rotation by a PR-1 in a path A, a polarization axis of the first polarization is corrected by a first polarizer, and the first polarization is incident on a PBS-2. By the first polarizer, a main polarization axis of the first polarization incident on the PBS-2 is aligned with a transmission polarization axis of the PBS-2.

A second polarization is subjected to polarization rotation by a PR-2 in a path B, a polarization axis of the second polarization is corrected by a second polarizer, and the second polarization is incident on the PBS-2. By the second polarizer, a main polarization axis of the second polarization is aligned with a reflection polarization axis of the PBS-2. The first polarizer and the second polarizer may be PBSs. In this configuration, unnecessary $E_{AY}$ is removed in the path A and unnecessary $E_{BX}$ is removed in the path B. An electric field component $E_A$ of the first polarization included in output light multiplexed by the PBS-2 becomes a target electric field component $E_{AX}$, and an electric field component $E_B$ of the second polarization included in the output light becomes a target electric field component $E_{BY}$.

In the analysis model of FIG. 15, the path A is represented by the Jones matrices as follows.

$$E_A = \begin{bmatrix} \sqrt{1-ER_{T2}} & 0 \\ 0 & \sqrt{ER_{T2}} \end{bmatrix} \begin{bmatrix} \sqrt{1-ER_{Ta}} & 0 \\ 0 & \sqrt{ER_{Ta}} \end{bmatrix}$$

$$\begin{bmatrix} \cos\left(-\theta - \frac{\pi}{2}\right) & -\sin\left(-\theta - \frac{\pi}{2}\right) \\ \sin\left(-\theta - \frac{\pi}{2}\right) & \cos\left(-\theta - \frac{\pi}{2}\right) \end{bmatrix} \begin{bmatrix} \sqrt{ER_{R1}} & 0 \\ 0 & \sqrt{1-ER_{R1}} \end{bmatrix} E_I$$

$$E_A = \begin{bmatrix} -\sqrt{1-ER_{T2}}\sqrt{1-ER_{Ta}} & \sqrt{1-ER_{T2}}\sqrt{1-ER_{Ta}} \\ \sqrt{ER_{R1}}\sin\theta & \sqrt{1-ER_{R1}}\cos\theta \\ -\sqrt{ER_{T2}}\sqrt{ER_{Ta}}\sqrt{ER_{R1}}\cos\theta & -\sqrt{ER_{T2}}\sqrt{ER_{Ta}}\sqrt{1-ER_{R1}}\sin\theta \end{bmatrix} E_I$$

[Expression 4]

$E_I$ is an input electric field to the polarization diversity optical circuit of the analysis model, $ER_{R1}$ is a polarization extinction ratio of a reflection port of the PBS-1, $\theta$ is a polarization rotation amount of the first polarization rotator, $ER_{Ta}$ is a polarization extinction ratio of the added first polarizer, and $ER_{T2}$ is a polarization extinction ratio of a transmission port of the PBS-2. Similarly, the path B is represented by the Jones matrices as follows.

$$E_B = \begin{bmatrix} \sqrt{ER_{R2}} & 0 \\ 0 & \sqrt{1-ER_{R2}} \end{bmatrix}$$

$$\begin{bmatrix} \cos\left(\theta + \frac{\pi}{2}\right) & -\sin\left(\theta + \frac{\pi}{2}\right) \\ \sin\left(\theta + \frac{\pi}{2}\right) & \cos\left(\theta + \frac{\pi}{2}\right) \end{bmatrix} \begin{bmatrix} \sqrt{1-ER_{T1}} & 0 \\ 0 & \sqrt{ER_{T1}} \end{bmatrix} E_I$$

$$E_B = \begin{bmatrix} -\sqrt{ER_{R2}}\sqrt{1-ER_{T1}}\sin\theta & -\sqrt{1-ER_{R2}}\sqrt{1-ER_{T1}}\cos\theta \\ \sqrt{ER_{R2}}\sqrt{ER_{T1}}\cos\theta & -\sqrt{1-ER_{R2}}\sqrt{ER_{T1}}\sin\theta \end{bmatrix} E_I$$

[Expressuib 5]

$E_I$ is an input electric field to the polarization diversity optical circuit of the analysis model, $ER_{T1}$ is a polarization extinction ratio of a transmission port of the PBS-1, $\theta$ is a polarization rotation amount of the second polarization rotator, $ER_{Ra}$ is a polarization extinction ratio of the added second polarizer, and $ER_{R2}$ is a polarization extinction ratio of a reflection port of the PBS-2.

Assuming that the input electric field $E_I$ is a linear polarization tilted by 45 degrees with respect to a polarization axis of the PBS-1, $E_A$ and $E_B$ are represented as follows.

$$E_A = \frac{1}{\sqrt{2}} \begin{bmatrix} -\sqrt{1-ER_{T2}}\sqrt{1-ER_{Ta}}\sqrt{ER_{R1}}\sin\theta + \\ \sqrt{1-ER_{T2}}\sqrt{1-ER_{Ta}}\sqrt{1-ER_{R1}}\cos\theta \\ -\sqrt{ER_{T2}}\sqrt{ER_{Ta}}\sqrt{ER_{R1}}\cos\theta - \\ \sqrt{ER_{T2}}\sqrt{ER_{Ta}}\sqrt{1-ER_{R1}}\sin\theta \end{bmatrix} E_I$$

[Expression 6]

$$E_B = \frac{1}{\sqrt{2}} \begin{bmatrix} -\sqrt{ER_{R2}}\sqrt{ER_{Ra}}\sqrt{1-ER_{T1}}\sin\theta - \\ \sqrt{1-ER_{R2}}\sqrt{1-ER_{Ra}}\sqrt{1-ER_{T1}}\cos\theta \\ \sqrt{ER_{R2}}\sqrt{ER_{Ra}}\sqrt{ER_{T1}}\cos\theta - \\ \sqrt{1-ER_{R2}}\sqrt{1-ER_{Ra}}\sqrt{ER_{T1}}\sin\theta \end{bmatrix} E_I$$

Figure 16:
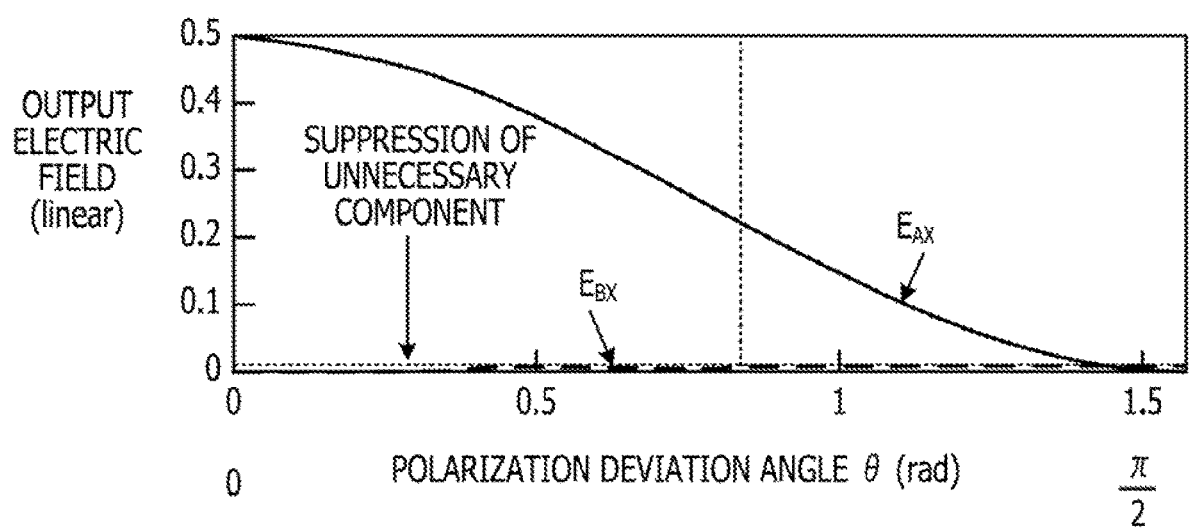
FIG. 16 is a diagram illustrating a change in an output electric field due to polarization angle deviation in a model of FIG. 15.

FIG. 16 is a plot of electric field intensity of each component with respect to angular deviation of polarization rotation (referred to as "polarization deviation angle"), assuming that $ER_{R1}=ER_{T2}=ER_{T1}=ER_{R2}=ER_{Ta}=ER_{Ra}=0.01$.

In FIG. 16, $\theta=0$ is the optimum state, an unnecessary component $E_{BX}$ is hardly generated, and a target electric field component $E_{AX}$ is the maximum. As $\theta$ increases, the target electric field component $E_{AX}$ decreases, but the unnecessary component $E_{BX}$ is suppressed small. Focusing on the path B, an effect similar to that in FIG. 16 may be obtained.

Figure 17:
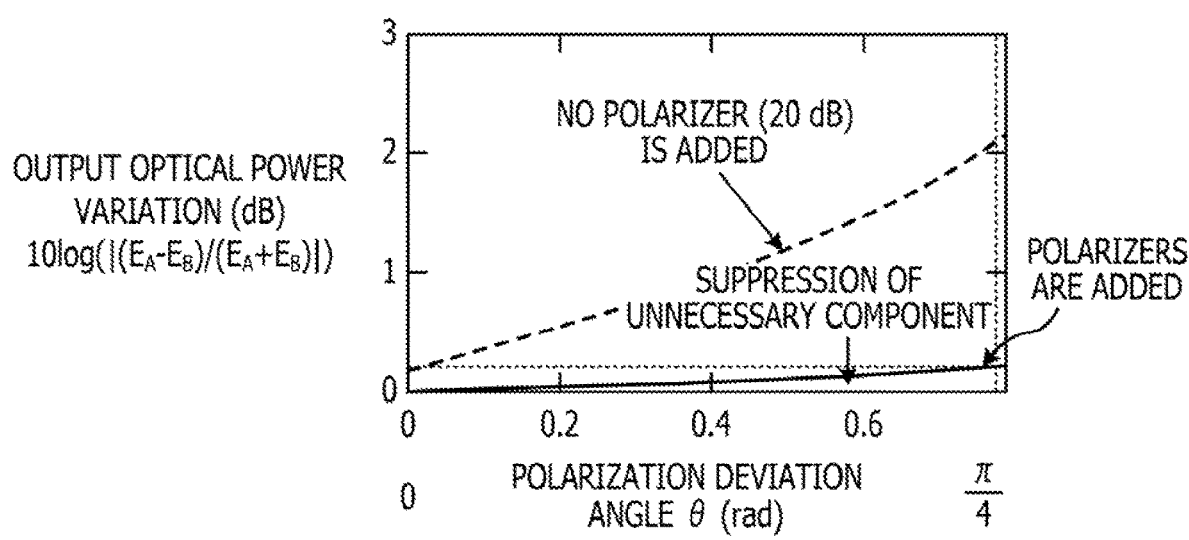
FIG. 17 is a diagram illustrating an effect of the addition of the polarizer.

FIG. 17 is a plot of a ratio of optical power between a strengthening interference state $|E_A-E_B|$ and a weakening interference state $|E_A+E_B|$ with respect to an angular deviation amount. Output optical power variation (dB) on a vertical axis is represented by $10 \log(|(E_A-E_B)/(E_A+E_B)|)$. A broken line is a characteristic of a conventional configuration in which no polarizer is added, and a solid line is a characteristic of the configuration of the embodiment in which the polarizers are arranged in front of the optical multiplexer (or PBC).

By adding the polarizers in a preceding stage of the PBS-2 for multiplexing light, even in a case where angular deviation of polarization rotation increases, unnecessary interference components are removed and temporal power variation of output light may be suppressed. As in the configuration examples of FIGS. 4 to 7, in a case where a PBS is used as an optical element for polarization correction, a polarization deviation component may be monitored by using a relatively inexpensively available 3-port PBS, and a polarization axis of each polarization may be corrected.

The configurations of the embodiments and the analysis model of FIG. 15 have meanings different from simply adding a filter to a wavelength converter. When the number of filters is simply increased, there is no dependency on the order or arrangement positions of filters, which are passive elements, so an optical element for polarization correction (polarizer or PBS) may be arranged before or after the PBS-2. However, even when the polarizer or PBS is arranged in a succeeding stage of the PBS-2, it is not possible to remove interference components ($E_{AY}$ in $E_A$ and $E_{BX}$ in $E_B$) because interference has already occurred. An absolute value of the interference component may be small, but a ratio to target light does not change.

In the analysis model, calculation is performed by setting a non-diagonal component of the Jones matrix of the polarizer to zero. However, in reality, slight polarization rotation and depolarization occur, so even when polarizers with an extinction ratio of 20 dB are layered in two stages, it is not possible to obtain an extinction ratio of 40 dB. In contrast, in the embodiments, the polarizer (optical element for polarization correction) is arranged between the output end of the non-linear optical medium and the PBS or PBC for multiplexing light. By the polarizer, an interference component generated by deviation of a polarization rotation amount is removed and an axis of a polarization incident on the optical multiplexer is aligned with a polarization axis of the optical multiplexer, so that an effect equivalent to improving a polarization extinction ratio may be obtained.

Non-linear optical phenomena in the wavelength converters of the embodiments include common optical parametric amplification, including four-wave mixing, sum or difference frequency generation, harmonic generation, and optical parametric oscillation, and the number of excitation light beams and a relative relationship of polarization states of the excitation light and the signal light is optional. Regardless of which phenomenon is used, by arranging the optical element for polarization correction between the emission end of the non-linear optical medium and the optical multiplexer, even when a polarization rotation amount varies due to an influence of a disturbance or the like, temporal power variation of output light may be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength converter comprising:
a polarization beam splitter configured to separate input light into a first polarization and a second polarization that are orthogonal to each other;
a non-linear optical medium configured to include a first incident end on which the first polarization separated by the polarization beam splitter is incident and a second incident end on which the second polarization separated by the polarization beam splitter is incident at a position different from a position of the first incident end;
an optical multiplexer configured to multiplex the first polarization that has passed through the non-linear optical medium and the second polarization that has passed through the non-linear optical medium; and
an optical element arranged between the non-linear optical medium and the optical multiplexer, and configured to correct a polarization axis of at least one of the first polarization and the second polarization incident on the optical multiplexer,
the optical multiplexer is a polarization beam combiner different from the polarization beam splitter,
the non-linear optical medium includes a first non-linear optical medium arranged in a first path from the polarization beam splitter to the polarization beam combiner, and a second non-linear optical medium arranged in a second path from the polarization beam splitter to the polarization beam combiner, and
the optical element includes a first optical element arranged between the first non-linear optical medium and the polarization beam combiner, and a second optical element arranged between the second non-linear optical medium and the polarization beam combiner,
the wavelength converter further comprising:
a first polarization rotator arranged between the first non-linear optical medium and the first optical element, the polarization axis of the first polarization that has exited the first non-linear optical medium is aligned with a transmission polarization axis of the first optical element; and a second polarization rotator arranged between the second non-linear optical medium and the second optical element, the polarization axis of the second polarization that has exited the second non-linear optical medium is aligned with a transmission polarization axis of the second optical element.

2. The wavelength converter according to claim 1, wherein a polarization state between the optical multiplexer and the optical element is adjusted by a polarization maintaining fiber or a spatial optical system to a predetermined polarization state.

3. The wavelength converter according to claim 1,
wherein the polarization axis of the first polarization is aligned with a first polarization axis of the polarization beam combiner,
wherein the first optical element removes a polarization deviation component from the first polarization that has exited the first non-linear optical medium,
wherein the polarization axis of the second polarization is aligned with a second polarization axis of the polarization beam combiner, and
wherein the second optical element removes a polarization deviation component from the second polarization that has exited the second non-linear optical medium.

4. The wavelength converter according to claim 3, further comprising:
a first polarization controlling device arranged between the first non-linear optical medium and the first optical element;
a first processor provided to form a feedback loop from the first optical element to the first polarization controlling device to control a polarization axis of the first polarization controlling device;
a second polarization controlling device arranged between the second non-linear optical medium and the second optical element; and
a second processor provided to form a feedback loop from the second optical element to the second polarization controlling device to control a polarization axis of the second polarization controlling device.

5. The wavelength converter according to claim 1,
wherein a loop from the polarization beam splitter through the non-linear optical medium to the polarization beam splitter is formed,
wherein the non-linear optical medium includes the first incident end on which the first polarization separated by the polarization beam splitter is incident in a first direction, and the second incident end on which the second polarization separated by the polarization beam splitter is incident in a second direction opposite to the first direction,
wherein the polarization beam splitter multiplexes the first polarization that passes through the non-linear optical medium in the first direction and returns to the polarization beam splitter and the second polarization that passes through the non-linear optical medium in the second direction and returns to the polarization beam splitter, and
wherein the optical element includes a first optical element arranged between the polarization beam splitter and the first incident end of the non-linear optical medium, and a second optical element arranged between the polarization beam splitter and the second incident end of the non-linear optical medium.

6. The wavelength converter according to claim 5, further comprising a polarization rotator arranged between the non-linear optical medium and the first optical element or the second optical element, and configured to align the polarization axis of the first polarization or the second polarization that has exited the non-linear optical medium with a transmission polarization axis of the second optical element or the first optical element, and with a reflection polarization axis or a transmission polarization axis of the polarization beam splitter.

7. The wavelength converter according to claim 5, further comprising:
   a polarization controlling device arranged between the non-linear optical medium and the first optical element or the second optical element; and
   a processor provided to form a feedback loop from the first optical element or the second optical element to the polarization controlling device, to control a polarization axis of the polarization controlling device.

8. The wavelength converter according to claim 1, further comprising:
   a first photodetector coupled to a reflection port of the first optical element; and
   a second photodetector coupled to a reflection port of the second optical element, and
   wherein the first optical element and the second optical element are beam splitters for polarization correction.

9. An optical transmission system comprising:
   a first optical communication device configured to transmit a first optical signal with a first wavelength band to which a second optical signal with a second wavelength band is converted by a wavelength converter that includes:
   a polarization beam splitter configured to separate input light into a first polarization and a second polarization that are orthogonal to each other,
   a non-linear optical medium configured to include a first incident end on which the first polarization separated by the polarization beam splitter is incident and a second incident end on which the second polarization separated by the polarization beam splitter is incident at a position different from a position of the first incident end,
   an optical multiplexer configured to multiplex the first polarization that has passed through the non-linear optical medium and the second polarization that has passed through the non-linear optical medium, and
   an optical element arranged between the non-linear optical medium and the optical multiplexer, and configured to correct a polarization axis of at least one of the first polarization and the second polarization incident on the optical multiplexer; and
   a second optical communication device configured to receive the first optical signal, and convert the first optical signal to the second optical signal by the converter,
   the optical multiplexer is a polarization beam combiner different from the polarization beam splitter,
   the non-linear optical medium includes a first non-linear optical medium arranged in a first path from the polarization beam splitter to the polarization beam combiner, and a second non-linear optical medium arranged in a second path from the polarization beam splitter to the polarization beam combiner, and
   the optical element includes a first optical element arranged between the first non-linear optical medium and the polarization beam combiner, and a second optical element arranged between the second non-linear optical medium and the polarization beam combiner,
   the wavelength converter further comprising:
   a first polarization rotator arranged between the first non-linear optical medium and the first optical element, the polarization axis of the first polarization that has exited the first non-linear optical medium is aligned with a transmission polarization axis of the first optical element; and
   a second polarization rotator arranged between the second non-linear optical medium and the second optical element, the polarization axis of the second polarization that has exited the second non-linear optical medium is aligned with a transmission polarization axis of the second optical element.

10. A wavelength conversion method comprising:
    separating, by using a polarization beam splitter of a wavelength converter, input light into a first polarization and a second polarization that are orthogonal to each other;
    receiving the first polarization on a first incident end of a non-linear optical medium;
    receiving the second polarization on a second incident end of the non-linear optical medium at a position different from a position of the first incident end,
    multiplexing, by using an optical multiplexer, the first polarization that has passed through the non-linear optical medium and the second polarization that has passed through the non-linear optical medium; and
    correcting a polarization axis of at least one of the first polarization and the second polarization incident on the optical multiplexer,
    the optical multiplexer is a polarization beam combiner different from the polarization beam splitter,
    the non-linear optical medium includes a first non-linear optical medium arranged in a first path from the polarization beam splitter to the polarization beam combiner, and a second non-linear optical medium arranged in a second path from the polarization beam splitter to the polarization beam combiner, and
    the optical element includes a first optical element arranged between the first non-linear optical medium and the polarization beam combiner, and a second optical element arranged between the second non-linear optical medium and the polarization beam combiner,
    the wavelength converter further comprising:
    a first polarization rotator arranged between the first non-linear optical medium and the first optical element, the polarization axis of the first polarization that has exited the first non-linear optical medium is aligned with a transmission polarization axis of the first optical element; and
    a second polarization rotator arranged between the second non-linear optical medium and the second optical element, the polarization axis of the second polarization that has exited the second non-linear optical medium is aligned with a transmission polarization axis of the second optical element.

* * * * *